US012572731B2

(12) United States Patent
Zhang et al.

(10) Patent No.: US 12,572,731 B2
(45) Date of Patent: Mar. 10, 2026

(54) INFORMATION PROCESSING METHOD AND APPARATUS, TERMINAL, AND STORAGE MEDIUM

(71) Applicant: Beijing Zitiao Network Technology Co., Ltd., Beijing (CN)

(72) Inventors: Lu Zhang, Beijing (CN); Wenzong Ma, Beijing (CN); Xinlei Guo, Beijing (CN); Xiaolin Fang, Beijing (CN); Hao Huang, Beijing (CN); Liang Chen, Beijing (CN); Lanjin Zhou, Beijing (CN); Linghui Zhou, Beijing (CN); Yingtao Liu, Beijing (CN); Dirun Huang, Beijing (CN); Xuebing Zeng, Beijing (CN); Zejian Lin, Beijing (CN); Yingjie You, Beijing (CN); Yunzhao Tong, Beijing (CN); Yuxiang Chen, Beijing (CN); Jiawei Chen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/511,991

(22) Filed: Nov. 16, 2023

(65) Prior Publication Data

US 2024/0086625 A1 Mar. 14, 2024

Related U.S. Application Data

(63) Continuation of application No. PCT/CN2022/089591, filed on Apr. 27, 2022.

(30) Foreign Application Priority Data

May 17, 2021 (CN) .......................... 202110535367.3

(51) Int. Cl.
| | | |
|---|---|---|
| *G06F 40/166* | (2020.01) | |
| *G06F 21/60* | (2013.01) | |
| *G06F 21/62* | (2013.01) | |

(52) U.S. Cl.
CPC .......... *G06F 40/166* (2020.01); *G06F 21/604* (2013.01); *G06F 21/6209* (2013.01)

(58) Field of Classification Search
CPC .................................................... G06F 40/166
See application file for complete search history.

(56) References Cited

U.S. PATENT DOCUMENTS 8,863,272 B1 * 10/2014 Maeng ..................... G06F 21/31
2005/0193334 A1 * 9/2005 Ohashi et al. .......... G96F 17/24
(Continued)

FOREIGN PATENT DOCUMENTS

| CN | 102722519 A | 10/2012 |
|---|---|---|
| CN | 105868173 A | 8/2016 |
(Continued)

OTHER PUBLICATIONS

International Patent Application No. PCT/CN2022/089591; Int'l Search Report; dated Jul. 27, 2022; 2 pages.
(Continued)

*Primary Examiner* — James J Debrow
(74) *Attorney, Agent, or Firm* — BakerHostetler

(57) ABSTRACT

An information processing method and apparatus, a terminal, and a storage medium. The information processing method comprises: determining first content in response to a first operation event of a first control in a first document (S11); and adding the first content to the first document on the basis of content information and type information of the first content (S12). The type information comprises first type information and/or second type information, the second type information having an association with the first type infor-
(Continued)

Acquire first content in response to a first operation event on a first control in a first document — S11

Add the first content to the first document based on content information and type information of the first content — S12 mation. In the described method, first content can be added to a first document according to content information and type information of the first content, so as to distinguish different ways of adding the first content.

19 Claims, 8 Drawing Sheets

(56) References Cited

U.S. PATENT DOCUMENTS

| | | | | |
|---|---|---|---|---|
| 2012/0254730 | A1* | 10/2012 | Sunderland et al. | ... G06F 17/00 |
| 2014/0095968 | A1* | 4/2014 | Harrop | ................. G06F 17/243 |
| 2017/0220567 | A1* | 8/2017 | Masson et al. | ... G06F 17/30011 |
| 2017/0270079 | A1* | 9/2017 | Rajwat et al. | ........ G06F 17/212 |
| 2022/0014580 | A1* | 1/2022 | Shadfar et al. | ....... H04L 65/602 |

FOREIGN PATENT DOCUMENTS

| | | | | | |
|---|---|---|---|---|---|
| CN | 106095797 | A | | 11/2016 | |
| CN | 106886418 | A | | 6/2017 | |
| CN | 107818088 | A | | 3/2018 | |
| CN | 108334479 | A | | 7/2018 | |
| CN | 110162758 | A | | 8/2019 | |
| CN | 110442851 | A | | 11/2019 | |
| CN | 111767563 | A | * 10/2020 | | ............ G06F 21/60 |
| CN | 112581104 | A | | 3/2021 | |
| JP | H11288412 | A | | 10/1999 | |
| JP | 2002049729 | A | | 2/2002 | |
| JP | 2002312090 | A | | 10/2002 | |
| WO | 2005050366 | A2 | | 6/2005 | |
| WO | 2010059720 | A1 | | 5/2010 | |

OTHER PUBLICATIONS

Notice of Reasons for Refusal for Japanese Application No. 2023-569791, mailed Feb. 4, 2025, 22 pages.
First office action for Chinese patent application No. 202110535367. 3, mailed on Apr. 30, 2025, 37 pages.
China Patent Application No. 202110535367.3; Second Office Action; dated Oct. 16, 2025; 36 pages.

* cited by examiner

Figure 1:
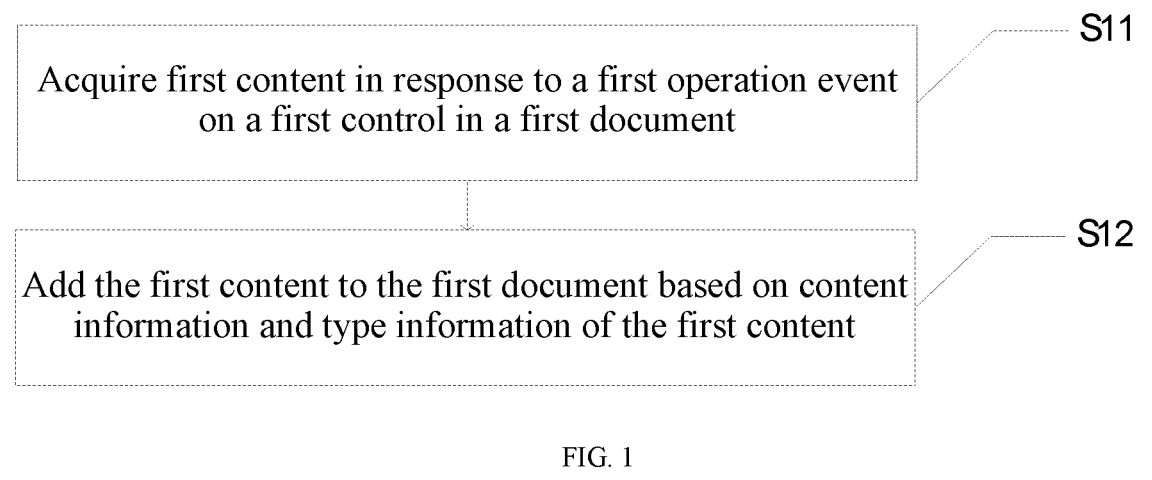

Acquire first content in response to a first operation event on a first control in a first document

S11

Add the first content to the first document based on content information and type information of the first content

Zhang San's progress report

At this stage, it is necessary to clearly refine the progress of tasks, and the progress of weekly key tasks is a guarantee of the overall project progress.

Search for employees by name or email to add

Period: January to March in 2021

February to April in 2020

May to July in 2020          Invalid

August to October in 2020

November to December in 2020

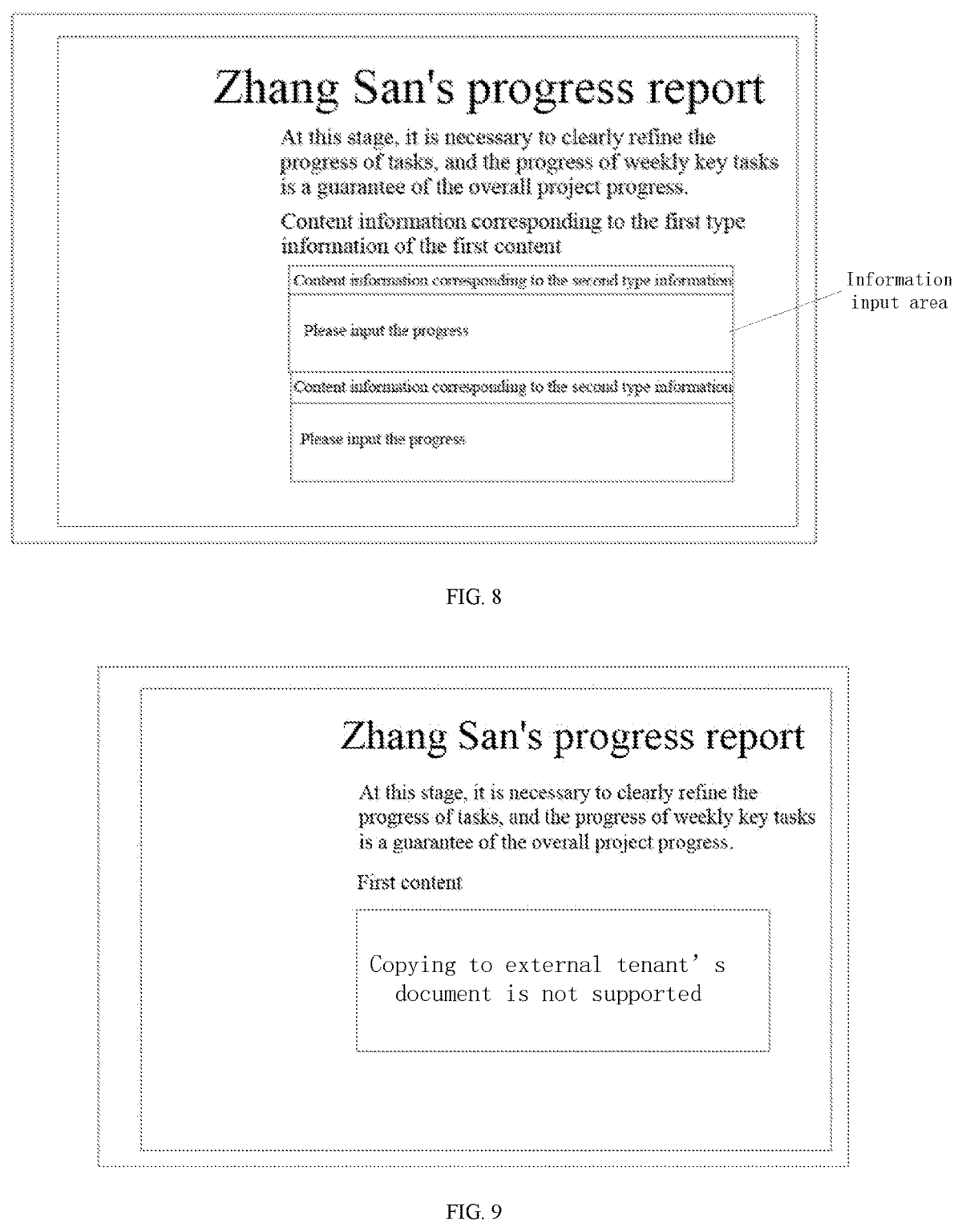

Zhang San's progress report

At this stage, it is necessary to clearly refine the progress of tasks, and the progress of weekly key tasks is a guarantee of the overall project progress.

Content information corresponding to the first type information of the first content Content information corresponding to the second type information Please input the progress Content information corresponding to the second type information Please input the progress Information input area

FIG. 8

Zhang San's progress report

At this stage, it is necessary to clearly refine the progress of tasks, and the progress of weekly key tasks is a guarantee of the overall project progress.

First content

Copying to external tenant's document is not supported

FIG. 9

Acquire first content in response to a first operation event on a first control in a first page S21

Create a first area and a second area in the first page S22

INFORMATION PROCESSING METHOD AND APPARATUS, TERMINAL, AND STORAGE MEDIUM

CROSS REFERENCE

The disclosure is a continuation of PCT application Ser. No. PCT/CN2022/089591, filed on Apr. 27, 2022, which claims the priority of the Chinese Patent Application No. 202110535367.3, filed on May 17, 2021, titled "INFORMATION PROCESSING METHOD AND APPARATUS, TERMINAL, AND STORAGE MEDIUM", both of which are incorporated herein by reference in their entireties.

TECHNICAL FIELD

The present disclosure relates to the field of information processing technologies, in particular to an information processing method and apparatus, a terminal, and a storage medium.

BACKGROUND

In processes of using electronic documents, content is usually required to be inserted by copy and paste. The inserted content may be, for example, texts, images, tables, and the like, so introduction of the content is relatively simple.

SUMMARY

The present disclosure provides an information processing method and apparatus, a terminal, and a storage medium.

The present disclosure uses the following technical solutions.

In some embodiments, the disclosure provides an information processing method, comprising:

acquiring first content in response to a first operation event on a first control in a first document; and adding the first content to the first document based on content information and type information of the first content, wherein the type information comprises first type information and/or second type information, and the second type information has an association relationship with the first type information.

In some embodiments, the disclosure provides an information processing method, comprising:

acquiring first content in response to a first operation event on a first control in a first page; and creating a first area and a second area in the first page, wherein the first area is used for displaying the first content, and the second area is used for inputting second content associated with the first content, wherein the second area is displayed at an associated position of the first area.

In some embodiments, the disclosure provides an information processing apparatus, comprising:

a determination unit, configured to acquire first content in response to a first operation event on a first control in a first document; and a control unit, configured to add the first content to the first document based on content information and type information of the first content, wherein the type information comprises first type information and/or second type information, and the second type information has an association relationship with the first type information.

In some embodiments, the disclosure provides an information processing apparatus, comprising:

a determination module, configured to acquire first content in response to a first operation event on a first control in a first page; and a control module, configured to create a first area and a second area in the first page, wherein the first area is used for displaying the first content, and the second area is used for inputting second content associated with the first content, wherein the second area is displayed at an associated position of the first area.

In some embodiments, the disclosure provides a terminal, comprising: at least one memory and at least one processor, wherein the at least one memory is configured to store program code, and the at least one processor is configured to call the program code stored in the at least one memory to perform the method according to any one of above.

In some embodiments, the disclosure provides a storage medium, the storage medium storing program code, and the program code being used for performing the method according to any one of above.

The information processing method provided in the embodiments of the present disclosure includes: acquiring first content in response to a first operation event on a first control in a first document; and adding the first content to the first document based on content information and type information of the first content, where the type information includes first type information and/or second type information, and the second type information has an association relationship with the first type information. The method provided in the embodiments of the present disclosure can add the first content to the first document based on the content information and type information of the first content, so as to distinguish addition of different first content. The first content belonging, to others may be inserted in some embodiments and the first content can be quickly synchronized and followed up in other embodiments.

BRIEF DESCRIPTION OF THE DRAWINGS

The foregoing and other features, advantages, and aspects of embodiments of the present disclosure will become more apparent in conjunction with the accompanying drawings and with reference to the following specific embodiments. Throughout the accompanying drawings, the same or similar accompanying symbols indicate the same or similar elements. It should be understood that the accompanying drawings are schematic and that elements and elements are not necessarily drawn to scale.

FIG. 1 is a flowchart of an information processing method according to an embodiment of the present disclosure.

FIG. 8 is a schematic diagram of display of the first document after the first content is inserted according to an embodiment of the present disclosure.

FIG. 9 is a schematic diagram of display of a fifth prompt message after paste failure according to an embodiment of the present disclosure.

DETAILED DESCRIPTION OF PREFERRED EMBODIMENTS

Figure 2:
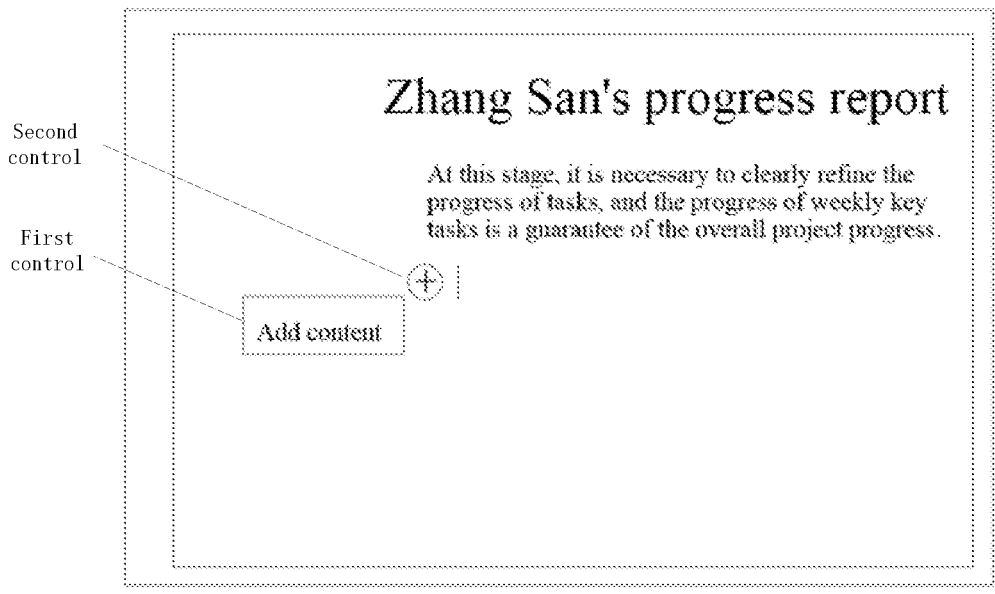
FIG. 2 is a schematic diagram of display of a first document when first content is not inserted according to an embodiment of the present disclosure.

Embodiments of the present disclosure will be described in greater detail below with reference to the accompanying drawings. Although certain embodiments of the present disclosure are shown in the accompanying drawings, it should be understood, however, that the present disclosure may be realized in various forms and should not be construed as being limited to the embodiments set forth herein, but rather are provided for a more thorough and complete understanding of the present disclosure. It should be understood that the accompanying drawings and embodiments of the present disclosure are for exemplary purposes only and are not intended to limit the scope of protection of the present disclosure.

It should be understood that the various steps documented in the method embodiments of the present disclosure may be performed in accordance and/or in parallel. Furthermore, the method embodiments may include additional steps and/or omit performing the illustrated steps. The scope of the present disclosure is not limited in this regard.

As used herein, the term "including" and its variations are open-ended, i.e. "including but not limited to". The term "based on" is "based at least in part on". The term "one embodiment" means "at least one embodiment"; the term "another embodiment" means "at least one additional embodiment"; the term "another embodiment" means "at least one other embodiment"; and the term "some embodiments" means "at least some embodiments". Related definitions of other terms will be given in the following description.

It should be noted that the concepts of "first", "second" and the like mentioned in the present disclosure are only used to differentiate different devices, modules or units, and are not used to define the order or interdependence of the functions performed by these devices, modules or units.

It should be noted that the modification of "a" mentioned in the present disclosure is schematic rather than restrictive, and the person skilled in the art should understand that it should be construed as "one or more" unless otherwise explicitly stated in the context.

The names of the messages or information interacted with between the plurality of devices of the presently disclosed embodiments are used for illustrative purposes only and are not intended to place limitations on the scope of those messages or information.

Solutions provided by embodiments of the present disclosure will be described in detail below with reference to the accompanying drawings. In some embodiments of the present disclosure, an information processing method is provided, as shown in FIG. 1, including steps S11 and S12 as follows.

S11: Acquire first content in response to a first operation event on a first control in a first document.

In some embodiments, the first control may be a tool option displayed in a tool bar. The first control may be directly displayed in the first document, or may be displayed in response to some operations. The first operation event may include one or more operations, such as a click operation on the first control. The first content may be task information, text information, image information, audio and video information, or the like. The first content may be automatically acquired after the first operation event is performed on the first control, or optional content is displayed and the first content is selected by a user. The first document is a content page used for carrying content information, which may be a page that can achieve a purpose of displaying content, such as an online document, a local file, an application page, a software page, or a web page.

S12: Add the first content to the first document based on content information and type information of the first content.

In some embodiments, the type information includes first type information and/or second type information, and the second type information has an association relationship with the first type information. In some embodiments, the type information of the first content may include only the first type information, or may include both the first type information and the second type information. Different type information corresponds to different content information in the first content. For example, the first content is task information, the first type information may be parent information in the task information, and the second type information may be child information of the parent information; or the first type information is primary information, and the second type information is secondary information. That is, the first type information and the second type information are different information having an association relationship, and the first type information and the second type information follow same information rules, or have a same content theme, or are both associated with another content.

In some embodiments of the present disclosure, based on the content information and type information of the first content, whether to add the first content to the first document may be determined, and a display form and a display position after the first content is added to the first document may also be determined. According to the information processing method provided in some embodiments, the first content is added to the first document based on the content information and type information of the first document, thereby enriching introduction ways of the first content and improving user experience.

Figure 3:
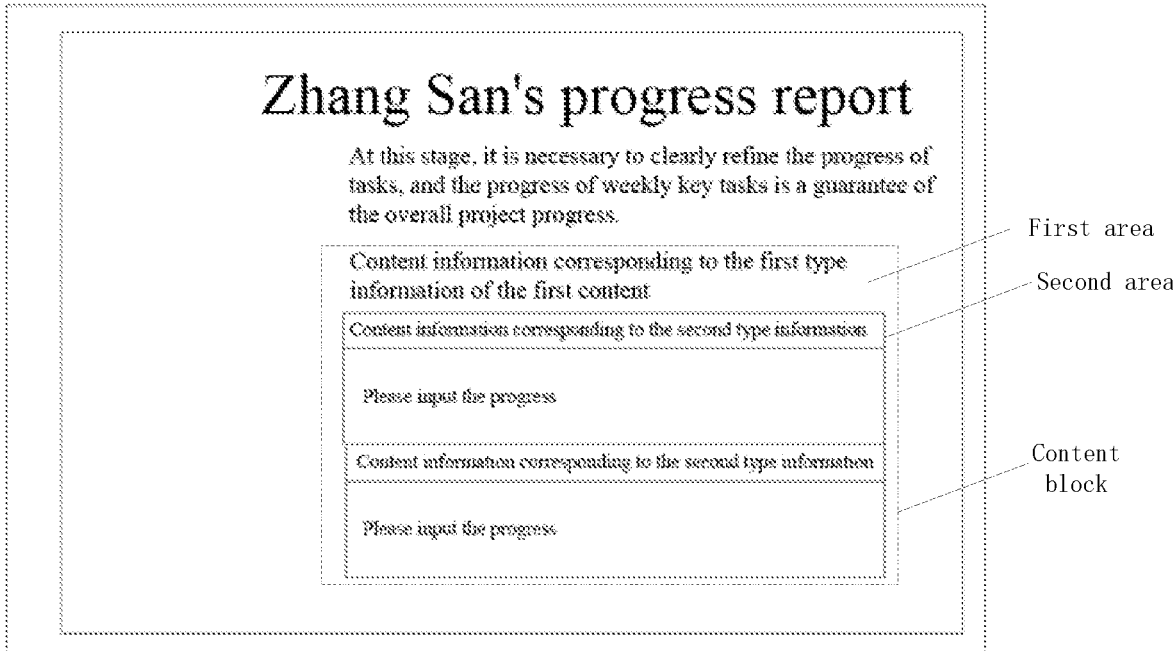
FIG. 3 is a schematic diagram of display of the first document after the first content is inserted according to an embodiment of the present disclosure.

In some embodiments of the present disclosure, a first content block is created in a main body area of the first document, the first content block being used for carrying the content information of the first content. In some embodiments, refer to FIG. 2 and FIG. 3. In FIG. 2, after the first control (Add content) is triggered, the first content is determined and added to the first document. As shown in FIG. 3, in the first document, the first content is displayed in a form of a content block. A content block carrying the first content is the first content block. The content block has a preset data format and may have a plurality of preset display areas to display specific types of data. By automatically displaying the first content in the form of a content block, the first content can be distinguished from general text information, and a structure of data display and distinctiveness from non-first content can be improved. In addition, the user does not need to manually adjust a display format, so user experience is improved.

In some embodiments of the present disclosure, in response to the type information including the first type information and the second type information, content information corresponding to the first type information is displayed in a first area of the first content block, and content information corresponding to the second type information is displayed in a second area of the first content block. In some embodiments, the first area may be a title area of the content block, and the second area may be a content area of the content block. As shown in FIG. 3, the content information corresponding to the first type information and the content information corresponding to the second type information are displayed in different areas, and their display styles may be different. For example, a display color or background color of the content information corresponding to the first type information may be different from that of the content information corresponding to the second type information, so as to distinguish the content information corresponding to the first type information and the content information corresponding to the second type information, and to improve the structure and distinctiveness of display. By automatically displaying different types of information in different preset areas according to the different type information when adding the first content, user's layout operations are reduced, and the user experience is better.

In some embodiments of the present disclosure, before acquiring first content in response to a first operation event on a first control in a first document, the method further includes: determining permission information of a user to whom a current user accessing the first document belongs in response to a trigger operation on a second control in the first document; displaying the first control in response to the user to whom the current user belongs has a first permission; and/or, not display the first control in response to the user to whom the current user belongs does not have the first permission. In some embodiments, the user may be a single user or a user set. A user may belong to another user, and a type of the user may be an individual group or a group user. The individual user may belong to the group user, for example, an employee user may belong to an enterprise user, and a member user may belong to a group user. Therefore, permission information of the current user is associated with the permission of the user to whom the current user belongs, the first control is displayed when the user to whom the current user belongs has the first permission, and the first control is not displayed when the user to whom the current user belongs does not have the first permission. As shown in FIG. 2, the second control may be a circle with a plus sign. After the second control is triggered, the permission information of the user to whom the current user belongs and whether to display the first control ("Add content" in FIG.

2) are determined. This avoids poor user experience caused by the fact that the first content cannot be inserted after the first control is triggered.

In some embodiments of the present disclosure, before acquiring first content in response to a first operation event on a first control in a first document, the method further includes: determining permission information of the current user accessing the first document and permission information of an owner of the first document in response to the trigger operation on the second control in the first document; not display the first control in response to the current user has a second permission and the owner of the first document does not have the second permission; and/or, not display the first control in response to the current user does not have the second permission and the owner of the first document has the second permission; and/or, displaying the first control in response to both the current user and the owner of the first document have the second permission. In some embodiments, for example, the first content is task information, and the second permission may be a permission to use the task information. If the current user does not have the second permission, the first content is naturally not allowed to be inserted into the first document, where the owner of the first document has a permission to the first document, but does not have the second permission. If the first content is inserted into the first document, the owner of the first document without the second permission may see or use the first content, resulting in confusion in permission management. Therefore, in some embodiments, the first control is displayed only when both the current user and the owner of the first document have the second permission, thereby ensuring orderliness of permission management.

Figures 4, 5:
FIG. 4 is a schematic diagram of display of the information selection control in the first document according to an embodiment of the present disclosure.
FIG. 5 is a schematic diagram of a first position in an information selection control according to an embodiment of the present disclosure.

In some embodiments of the present disclosure, the acquiring first content in response to a first operation event on a first control in a first document includes: displaying an information selection control in response to the trigger operation on the first control in the first document; and acquiring the first content in response to a selection operation on first content information displayed by the information selection control. In some embodiments, the first content information may be a same type of information as the first content, where the type of information may include the first content, for example, when the first content is task information, the first content information is also task information. In other embodiments, information to which the first content information belongs is the same type of information as the first content, for example, when the first content information is task information, the first content information may be partial information in the task information. In some embodiments, as shown in FIG. 4, after the first operation event is performed on the first control, the information selection control is displayed, where the information selection control displays optional first content information (such as target 1, target 2, and target 3 in FIG. 4, which are optional first content information). In some embodiments, the first content information displayed in the information display selection control is first content information associated with the current user, which may be, for example, information created by the current user, information that the current user participates in, or information that the user is responsible for reviewing. The first content information in the information selection control may be sorted according to a degree of association with the current user, or sorted according to update time of the first content information, so that the user can quickly find information most associated with the current user or recently updated.

In some embodiments of the present disclosure, as shown in FIG. 4, the information selection control has a first position inside (the position of bold target 1 in FIG. 4), and a display style of the first content information displayed in the first position is different from that of the first content information displayed in other positions in the information selection control. In some embodiments, default preselected first content information may be provided by providing the first position. The first content information in the first position may be selected through click, click on a confirmation control, or click on a preset button (such as Enter), while the first content information in a non-first position may be selected by double click, click and then click on the confirmation control, or click and then click on a preset button, where the first position may be a first place in the information selection control (for example, arranged at the top).

In some embodiments of the present disclosure, a third control displaying in the information selection control, the third control is used for selecting a time period, and the first content information displayed by the information selection control is associated with the currently selected time period in the third control. In some embodiments, as shown in FIG. 4, the third control (control on January to March in 2021 in FIG. 4) displays the selected time period, and the information displayed in the information selection control is associated with the selected time period, for example, start time, end time, or creation time of the first content is within the selected time period, so that the user can quickly find, from mass information, desired information to be added to the first document.

In some embodiments of the present disclosure, the time period of current time is selected by default in the third control. In some embodiments, the time period is determined according to the information associated with the current user, that is, the third control may provide only the time period of the information associated with the current user, which can avoid invalid operations caused by selecting unconcerned time periods when the user selects information.

In some embodiments of the present disclosure, in response to there is no first content information associated with the selected time period in the third control, first preset information is displayed in the information selection control. The first preset information may be, for example, information not associated within the selected time period. In some embodiments, if there is no first content information associated with the selected time period in the third control, the confirmation control in the information selection control is not available, and there is no first content information that may be selected. Therefore, the confirmation control used for determining the selected first content information is not available at this time. In some embodiments, display styles of the confirmation control in an available state and an unavailable state are different, for example, the confirmation control in the unavailable state may be gray, and the confirmation control in the available state may be bold.

In some embodiments of the present disclosure, a first type time period is hidden in the third control, a first marker is displayed in an associated area of a second type time period displayed in the third control, and second preset information is displayed within the second type time period displayed in the third control after a second operation is performed. In some embodiments, the first type time period may be a time period preset as invalid, or a time period in which there is no associated first content information or the associated first content information is unrelated to the current user. By hiding the first type time period, poor user experience caused when the user selects the first type time period is avoided. The second type time period may be an invalid time period, which may be, for example, a time period in which there is associated first content information but all the associated first content information is in an invalid or completed state. As shown in FIG. 5, the associated area of the invalid time period may display "invalid" as the first marker. The second operation may be a hover operation on a control identifier, and the second preset information may be information prompting that a time period is the second type time period.

Figure 6:
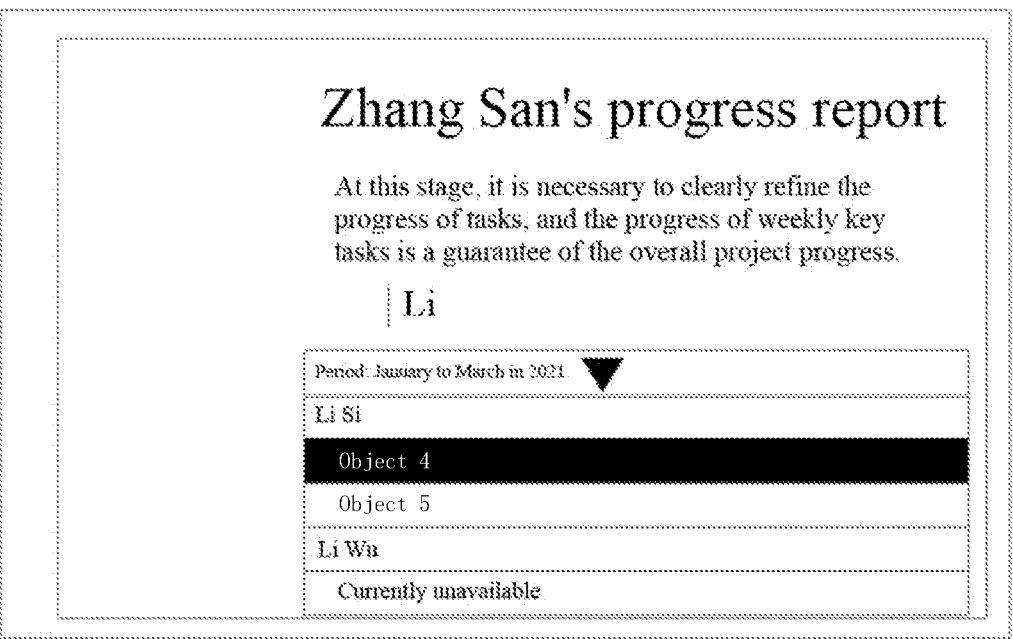
FIG. 6 is a schematic diagram of display of the first document after a search condition is input according to an embodiment of the present disclosure.

In some embodiments of the present disclosure, after the information selection control is displayed, in response to a search condition input in the first document or information selection control, the associated first content information is searched according to the input search condition and the searched first content information is displayed in the information selection control. In some embodiments, as shown in FIG. 6, an area for inputting the search condition ("Li" input in FIG. 6) may be preset in the first document or information selection control, and information may be searched in this area. In some embodiments, when the search condition input in the area for inputting the search condition exceeds a preset length, the search condition is automatically displayed by line wrap. In some embodiments, in response to there is no search result that satisfies the search condition, displaying a prompt message to prompt that there is no search result.

In some embodiments of the present disclosure, the input search condition is received in a content area associated with an area where the first content is located in the first document. In some embodiments, the content area for inputting the search condition is located in the first document, and the content area is associated with the area where the first content is located. Because the associated area of the area for inputting the search condition displays the first content, the content area for inputting the search condition may change with the changing area where the first content is displayed.

In some embodiments of the present disclosure, the searching the associated first content information according to the input search condition includes: obtaining a target user who satisfies the search condition, and determining the first content information associated with the target user; determining whether the current user has a preset permission for the first content information associated with the target user; and displaying first content information for which the current user has the preset permission in the first content information associated with the target user. In some embodiments, as shown in FIG. 6, users are searched, the first content information associated with the user is displayed, a person who perform search does not knows specific content of the searched first content information, and the search result displays only the first content information for which the current user has the preset permission, instead of first content information for which the current user does not have the preset permission, whereby permission management is better performed, and information leakage is avoided. In addition, because the information for which the current user does not have preset permission is not displayed, the search user will not be aware that his permission is limited, where the preset permission may be, for example, a view permission.

In some embodiments of the present disclosure, a first prompt message is displayed in the information selection control in response to there is no first content information associated with the target user who satisfies the search condition or the current user does not have the preset permission for the first content information of the target user.

In some embodiments, the first prompt message may be "Currently unavailable" as shown in FIG. 6. If there is no first content information associated with only some target users, the first prompt message is displayed only in corresponding areas of the target users without the associated first content information, and for the target users with associated information, their corresponding areas display the associated first content information.

Figure 7:
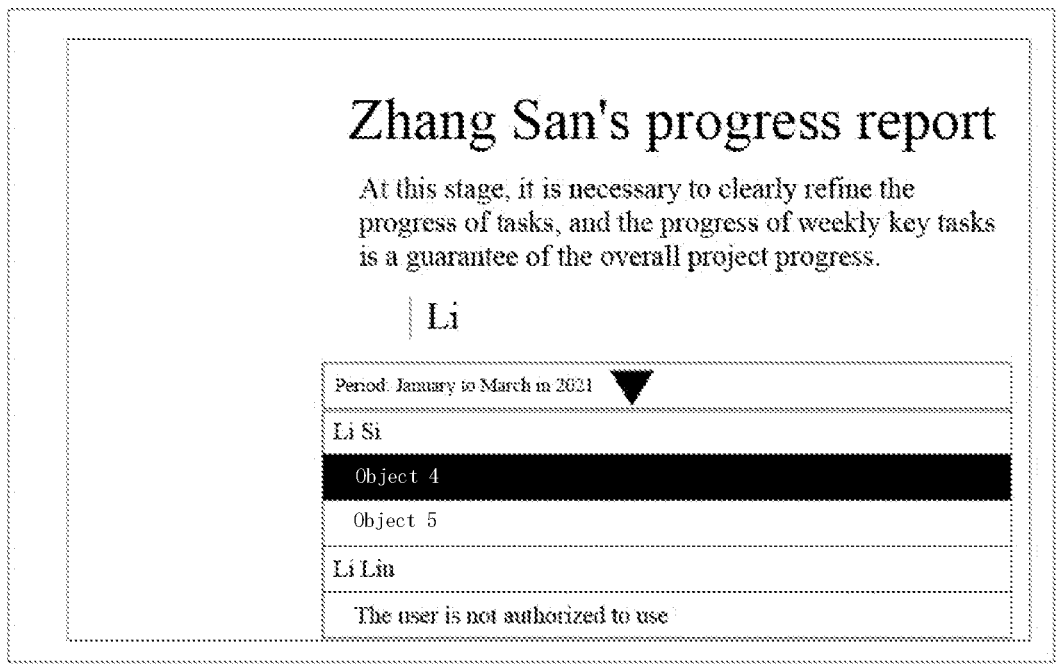
FIG. 7 is a schematic diagram of display of the information selection control in the first document according to an embodiment of the present disclosure.

In some embodiments of the present disclosure, a third prompt message is displayed in the search result in response to the target user does not have the second permission. In some embodiments, as shown in FIG. 7, the searched target user is not authorized to use and create the first content and similar content of the first content, that is, does not have the second permission. In this case, the third prompt message ("The user is not authorized to use" in FIG. 7) is displayed to inform the user of a reason of failing to obtain the first content information associated with the target user. In some embodiments, the third prompt message is displayed in the associated area of the found user who does not have the second permission.

In some embodiments of the present disclosure, the displaying the first content information in the information selection control includes: displaying the content information corresponding to the first type information in the first content information in the information selection control, and hiding the content information corresponding to the second type information in the first content information. In some embodiments, the first content information displayed in the information selection control may include same type information of the first content and the first content, and the same type information of the first content further include corresponding type information and content information. The first content information displayed in the information selection control does not display the content information associated with the second type information, but displays the content information associated with the first type information. If all the first content information in the first content is displayed simultaneously, a large display area will be occupied, resulting in a significant decrease in a quantity of information that can be displayed once in the information selection control. Therefore, only the content information associated with the first type information is displayed. In some embodiments, a maximum size of a display interface of the information selection control is fixed, and the information selection control displays a page turning component or a sliding component to switch the first content information displayed in the information selection control.

In some embodiments of the present disclosure, the acquiring the first content in response to a selection operation on first content information displayed by the information selection control includes: in response to the selection operation on the content information corresponding to the first type information, determining whether the selected first type information has associated second type information; in response to the selected first type information has the associated second type information, determining that the first content information to which the first type information belongs is the first content; and/or, in response to the selected first type information does not have the associated second type information, displaying a fourth prompt message and maintaining the display of the information selection control. In some embodiments, the first content information includes the first content and the same type information of the first content, the type information of the first content information includes the first type information and the second type information, and the information selection control displays only different content information corresponding to the first type information of the first content information. Therefore, after the content information corresponding to the first type information displayed in the information selection control is selected, if it is found that the selected first type information does not have the associated second type information, the first content information to which the first type information belongs will not be selected. Instead, a prompt is given, for example, to prompt that the first type information does not have the associated second type information. In this case, the information selection control will not be hidden, so that the user can continue to select the first content information from the information selection control. If the selected first type information has the associated second type information, the corresponding first content information may be added to the first document as the first content and the information selection control may be hidden.

In some embodiments of the present disclosure, a third control displaying in the information selection control, the third control is used for selecting a time period, the first content information displayed by the information selection control is associated with the time period selected in the third control, and the first document or the search condition input in the information selection control is retained in response to the time period selected in the third control is switched. In some embodiments, when the selected time period is switched, the input search condition is not deleted, so the user does not need to input the search condition again. In some embodiments, in response to the time period selected in the third control is switched, displaying a search result corresponding to the switched time period. For example, after a preliminary search result is obtained by search according to the search condition, a search result associated with the switched time period is selected from the obtained preliminary search result. In this case, the search result will be automatically displayed without user's secondary search.

In some embodiments, the method further includes: in response to a drag operation on a content block, moving the dragged content block to a dragged position.

In some embodiments of the present disclosure, the method further includes: in response to a preset trigger operation on the first content, opening a second page carrying the first content or a login page for logging in to the second page. In some embodiments of the present disclosure, the second page may not be a page in the first document of the present disclosure, but another page, such as a page in a server. For example, the second page may be a page where the first content stored in the server is located. After the preset trigger operation is performed on the first content, the page where the first content is located in the server or the login page for logging in to the second page is automatically opened.

In some embodiments of the present disclosure, in response to the first document is a first type document, opening an associated page of the first content and positioning to the content information corresponding to the first type information in the associated page after the content information corresponding to the first type information displayed in the first document is triggered, thereby reducing user operations to determine the first content.

In some embodiments, in response to the first document is a second type document and the current user has logged in to an account, opening the second page and positioning to the content information corresponding to the first type information in the second page after the first type information displayed in the first document is triggered.

In some embodiments, in response to the first document is the second type document and the current user has not logged in to the account, opening the login page for the second page after the first type information displayed in the first document is triggered. In some embodiments, after logging in on the login page, the second page is opened and positioned to the first type information.

In some embodiments, documents have different types, including the first type document and the second type document. The first type document may be a progress report, which has a preset permission capable of positioning to the associated page. The first type document may be a document created or owned by the current user. The second document may be a document for which the current user has a view permission. After the content information displayed in the first type document is triggered, the associated page of the first content (for example, the page of the first content in the server) is opened. The account may be an account in a server in which the first type information stored. For the second type document, whether the current user has logged in to the account (for example, logged in to the server) is automatically determined. If the current user has logged in to the account, it indicates that the current user is an owner or creator of the first type information in the second type document. If the current user has not logged in to the account, it cannot prove that the current user is the owner or creator of the first type information, so the login page for the second page is displayed.

In some embodiments of the present disclosure, an information input area associated with the content information corresponding to the second type information is displayed in the second area of the first content block, where the information input area is used for inputting content. In some embodiments, as shown in FIG. 8, the content information corresponding to the second type information is displayed in the second area of the first content block. The content information corresponding to the second type information has an associated information input area, the user may input information in the information input area, and the input information may be automatically associated with the content information corresponding to the second type information, so that the user does not need to manually perform associated operations, and the user can easily explain the content information corresponding to the second type information. Content in the information input area may be edited, and the content information in the first content may be set as non-editable.

In some embodiments of the present disclosure, a comment control is displayed after a second operation event is performed on the content information corresponding to the first type information displayed in the first document, the content information corresponding to the second type information, or the information in the information input area, where the comment control is used for inputting comment information about the information on which the second operation event is performed. In some embodiments, in the first document, the second operation event may be performed on some or all of the content information corresponding to the first type information in the first content, the second operation event may be performed on some or all of the content information corresponding to the second type information in the first content, or the second operation event may be performed on some or all of the information in the information input area. The second operation event may be a selection event, for example, content is selected by pressing a mouse for box selection or drag, then the comment control is displayed, and the comment information may be input in the comment control, where the comment information may be bound with the selected content. After the comment information is input in the comment control, a comment identifier may be displayed in an associated area of the selected content to identify that the content has associated comment information.

In some embodiments of the present disclosure, the information in the information input area includes at least one of the following: text information, image information, title information, bold information, italic information, underlined information, an ordered list, an unordered list, a task list, a hyperlink, a combination of a first preset identifier and a user name, and a combination of a second preset identifier and a document name. The combination of the first preset identifier and the user name is used for reminding a user pointed to by the user name, for example, the user pointed to by the user name is reminded through an instant messaging tool. The combination of the second preset identifier and the document name is used for reminding a document pointed to by the document name, for example, a reminder is sent to a user who created the document pointed to by the document name, or a reminder message is displayed when the document pointed to by the document name is opened.

In some embodiments of the present disclosure, in response to a content block in the first document is cut and pasted into the first document, retaining comment information of the cut content block in the first pasted content block after cutting, and not retaining the comment information of the cut content block in the nth time pasted content block after cutting, where n is not less than 2. In some embodiments, the content block may be any one or more content blocks, such as the first content block. The content block may carry the first content or the same type information of the first content. After the content block is cut and pasted in a document, the comment information is retained only during first paste and may be displayed in the comment control, but the comment information will not be retained during subsequent pastes, thereby avoiding a problem that redundant information caused by repeatedly displaying the comment information affects reading efficiency. In other embodiments, the comment information is retained in the cut and pasted content block, or a pop-up window is displayed to inquire whether to retain the comment information, and whether to retain the comment information after paste is determined according to a result selected in a pop-up box.

In some embodiments of the present disclosure, in response to the content block in the first document is cut and pasted to a position outside the first document, not retaining the comment information of the cut content block in the first document during paste. In some embodiments, the position outside the first document may be, for example, another document or another position not in the first document, and the comment information is not retained during paste to prevent information leakage. In other embodiments, the comment information of the cut content block is retained during paste, or whether to retain the comment information is determined according to a permission of a paste operation user, and the comment information is retained when the permission requirement is met, otherwise the comment information is not retained. In other embodiments, when the content block is pasted to the position outside the first document, a pop-up box pops up to inquire whether to retain the comment information, and whether to retain the comment information is determined according to a result selected in the pop-up box.

In some embodiments of the present disclosure, after the content block in the first document is copied and pasted, the comment information of the copied content block in the first document is not retained in the pasted content. In some embodiments, regardless of where the content block in the first document is copied and pasted, the comment information is not retained, because the retaining comment information may result in repeated display of the comment information when copied and pasted into the first document, and the retaining comment information may lead to information leakage when copied and pasted to other positions. In other embodiments, after the content block in the first document is copied and pasted, the comment information is retained, or a pop-up box pops up to inquire whether to retain the comment information, and whether to retain the comment information is determined according to a result selected in the pop-up box.

In some embodiments of the present disclosure, after the first type information and/or second type information in the content block are copied and pasted, the comment control is not displayed after the second operation event is performed on the pasted content. In some embodiments, when an object of a copy and paste operation is content in the content block, but not the entire content block, the comment control is not displayed after the second operation event is performed on the pasted content. In some embodiments, the content in the content block is not of the content block after being copied and pasted, and may be displayed in a form of text. The comment control is displayed only after the second operation event is performed on the content in the content block.

In some embodiments of the present disclosure, the content information associated with the first type information and the content information associated with the second type information in the content block are set to be reproducible but not cuttable.

After the content block in the first document is cut and pasted or copied and pasted into a document, a display style of target content in the pasted content is different from that of non-target content, where the target content includes at least one of the following: a link, the combination of the first preset identifier and the user name, and the combination of the second preset identifier and the document name. In some embodiments, the target content in the content block is displayed prominently, for example, highlighted. For the pasted content, an operation such as highlighting a bold, adding an underline, setting a background color, setting an ordered list, or setting an unordered list may be performed.

In some embodiments of the present disclosure, after all or some of the content in the information input area is cut and pasted or copied and pasted, a display style of target content in the pasted content is the same as that of non-target content, where the target content includes at least one of the following: a link, the combination of the first preset identifier and the user name, and the combination of the second preset identifier and the document name.

In some embodiments of the present disclosure, in response to a third operation event on document content of the first document, target document content in the first document is determined; and in response to a fourth operation event on the first document, paste content is determined according to the current user, a second user to which the second document belongs, and the target document content, and the paste content is pasted into the second document.

In some embodiments, the third operation may be a copy or cut operation, the target document content may be document content on which the copy or cut operation is performed, the document content on which the copy or cut operation is performed may be some or all of the content in the first document, the target content may be a content block, and the content block may be the first content block. During paste, not all the copied or cut content is pasted into the second document, but the paste content in the target document content is determined based on the current user and the second user described in the second document, where the paste content may be some or all of the target document content. In this way, better permission management may be achieved during copy and paste or cut and paste.

In some embodiments of the present disclosure, determining paste content according to the current user, a second user to which the second document belongs, and the target document content includes: in response to the current user and the second user are the same user, the paste content is the target document content.

In some embodiments of the present disclosure, the determining paste content according to the current user, a second user to which the second document belongs, and the target document content includes: in response to the current user and the second user are two different users belonging to the same user, the paste content is the target document content. In some embodiments, a user may belong to another user, for example, an individual user belongs to a group user, an individual user belongs to another user set, or a member user belongs to an organizational user. When the current user and the second user belong to the same user, it indicates a strong association relationship between the two, and the target document content is allowed to be pasted.

In some embodiments of the present disclosure, the determining paste content according to the current user, a second user to which the second document belongs, and the target document content includes: in response to the current user and the second user belong to different users, the paste content includes: other document content in the target document content except the content block where the first content is located, or, the paste content includes: a fifth prompt message, which is used for replacing the first content. In some embodiments, the current user and the second user belong to different users, for example, belong to different group users. In this case, the association relationship between the two is weak. To protect security and privacy, the content of the content block is not allowed to be copied and pasted. For the position of the content block, the fifth prompt message may be displayed to inform the user. For example, the first content is objective and key result information, the first type information is objective information, the second type information is key result information, and the target document content is a content block carrying the objective and key result information. Refer to FIG. 9. When a content block in the first document is copied and pasted into the second document, if the current user and the second user to which the second document belongs belong to different users, the paste fails, and the fifth prompt message "Copying to external tenant's document is not supported" is displayed.

In some embodiments of the present disclosure, in response to a paste operation in the information input area, whether the pasted content is content of a preset type is determined, and a sixth prompt message is displayed in response to the pasted content is not the content of the preset type; or the pasted content is pasted into the information input area in response to the pasted content is the content of the preset type. In some embodiments, the content of the preset type may be content that is not displayed in the content block, while content of types except the preset type may be content that can only be displayed in the content block, for example, multi-dimensional tables, forms, and the like cannot be displayed in the information input area, and when the content is pasted into the information input area, the sixth prompt message is displayed to indicate that the paste fails.

In some embodiments of the present disclosure, in response to a fifth operation event on the first document, a third document is created according to the current user, the first user to which the first document belongs, and the document content of the first document. In some embodiments, the fifth operation event may be, for example, a copy event for copying a document.

In some embodiments of the present disclosure, creating a third document according to the current user, the first user to which the first document belongs, and the document content of the first document includes: in response to the current user and the first user are the same user, creating the third document, where the third document is a copy of the first document; in response to the current user and the first user are two different users belonging to the same user, creating the third document, where the third document is a copy of the first document; or in response to the current user and the first user are two users belonging to two different users, creating the third document, where the document content of the first document includes: the content block carrying the first content or carrying the same type information of the first content, and other document content, and document content of the third document includes: the other document content and the sixth prompt message, where the sixth prompt message may be used for replacing the first content or the same type information of the first content. For example, the first content is task information. The document content of the third document may include document content after all content blocks carrying the task information are removed from the document content of the first document, and the sixth prompt message is displayed at the content blocks where the task information is located. The content block may carry the first content information or the same type information of the first content information, for example, when the first content information is task information, the content block may carry the task information.

In some embodiments, for example, the current user is user A, the first user is user B, and the current user and the first user belong to a tenant(s). If user A and user B belong to the same tenant and user B creates the first document, user A may create a copy of the first document. If user A and user B belong to different tenants, the copy of the first document created by user A does not contain any content block in the first document, and the position of the content block in the first document is displayed as a placeholder for the sixth prompt message, such as "Copying content blocks to external tenants is not supported".

In some embodiments of the present disclosure, the method further includes: in response to an edit operation on the content in the information input area of the content block in the first document, displaying first edit content in the information input area and sending first data to a first terminal to enable the first document opened on the first terminal to display the first edit content in real time; and/or, in response to receiving second data sent by the first terminal, displaying second edit content in the content block of the first document according to the second data. In some embodiments, the content block is used for carrying the first content or carrying the same type information of the first content. The content block may be the first content block or another content block carrying the same type information of the first content in the first document. In a case that the first document is opened on an execution end of this method and the first terminal separately, after the edit operation is performed on the content block in the execution end of this method, the first terminal synchronously displays the content edited by the edit operation. Similarly, after the edit operation is performed on the first terminal, the execution end of this method synchronously displays the content edited by the edit operation to achieve collaborative operation. The execution end of this method and the first terminal may simultaneously perform the edit operation on the same or different information input areas in the same content block of the first document.

In some embodiments of the present disclosure, in response to a first information input area in the content block of the first document is in an edit state, the first information input area of the first document opened at a second terminal is in a non-editable state, or in response to the first information input area of the first document is in a non-edit state, the first information input area of the first document opened at the second terminal is in an editable state. In some embodiments, the first information input area is any information input area, and when the first information input area is in the edit state, the first document is not allowed to be opened to edit the content in the first information input area on other terminals.

Figure 10:
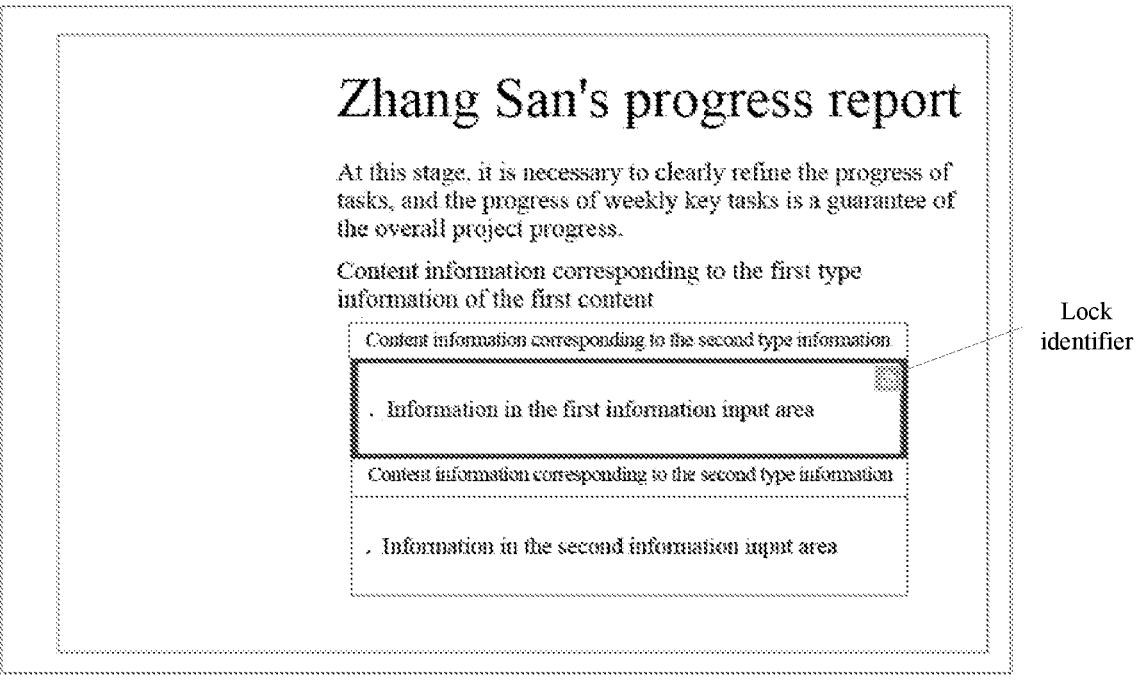
FIG. 10 is a schematic diagram of display in the first document when a lock identifier is displayed according to an embodiment of the present disclosure.

In some embodiments of the present disclosure, the content block in the first document may be the first content block or another content block carrying the same type information of the first content, the content block may have an information input area, and the first information input area may be an information input area of any content block. In response to the first information input area in the content block of the first document is in the edit state, displaying a lock identifier in an associated area of the first information input area of the first document opened at the second terminal, or in response to the first information input area of the first document is in the non-edit state, hiding the lock identifier. In some embodiments, reference may be made to FIG. 10, which shows a display style of the first document opened on the second terminal when the first information input area is in the edit state. It may be seen that the lock identifier (a lock symbol in FIG. 10) is displayed in the associated area of the first information input area, so that a user using the second terminal can know that the first information input area is in the edit state to avoid a situation where the user of the second terminal cannot edit the first information input area.

In some embodiments, when the first information input area of the first document is in the edit state, a display style of the first information input area of the first document opened at the second terminal is different from that of the first information input area of the first document opened at the second terminal when the first information input area of the first document is in the non-edit state. In some embodiments, with reference to FIG. 10, the display style of the first information input area may be distinguished from the display style in the non-edit state on the second terminal, thereby indicating more intuitively that the first information input area is in the edit state.

In some embodiments of the present disclosure, when the first information input area of the first document is in the non-edit state, displaying a seventh prompt message in response to a sixth operation is performed on the first information input area of the first document opened at the second terminal. In some embodiments, the sixth operation may be, for example, a hover operation, such as controlling the mouse to hover over the first information input area in the non-edit state to prompt that the first information input area is in the non-edit state, and the prompted seventh information may be displayed in the associated area of the lock identifier to remind the user that the first information input area displays the lock identifier. The content of the first information input area in the non-edit state may be copied, and after the second operation event is performed, the comment control is displayed. In this case, the mouse may be in a non-disabled state.

In some embodiments of the present disclosure, in response to the first information input area in the content block of the first document is in the edit state, the first information input area in the first document opened on a third terminal is in the editable state. In some embodiments, the content block may be the first content block or another content block carrying the same type information of the first content, the content block has an information input area, and the first information input area may be an information input area of any content block. When the first information input area is not edited, locking of the first information input area is released and the lock identifier is not displayed. In this case, the first information input area in the first document opened on the third terminal is in the editable state and may be edited.

In some embodiments of the present disclosure, a communication connection is established in advance with the associated page of the first content; in response to the associated page of the first content is connected, displaying a preset placeholder in the information input area where content is not input in the first content block; and in response to the associated page of the first content is disconnected, hiding the preset placeholder. In some embodiments, the associated page of the first content may be located on a server, and during the communication connection with the associated page of the first content, the information input area displays the preset placeholder by default. As shown in FIG. 8, the information input area displays "Please input the progress" as the preset placeholder, which may remind the user that information may be input to the information input area. In this case, the content in the information input area may be synchronized to the associated page of the first content. After the communication with the associated page of the first content is disconnected, the preset placeholder will not be displayed, and the first content in the first document cannot be synchronized to the associated page.

In some embodiments of the present disclosure, in response to the associated page of the first content is disconnected and the first content block is in the non-edit state when disconnected, displaying an eighth prompt message when a seventh operation is performed on the first content block. In some embodiments, the seventh operation may be a mouse hover operation, the eighth prompt message is displayed when the mouse is hovered over the first content block, and the eighth prompt message may be "The network is abnormal, and edit is not allowed".

In some embodiments of the present disclosure, in response to the associated page of the first content is disconnected and the first content block is in the edit state when disconnected and the third control is not called out, displaying a ninth prompt message. In some embodiments, the third control may be, for example, any edit control, such as a style adjustment control. When the first content block is in the edit state (for example, the information input area is in the edit state), the first content block is disconnected from the associated page of the first content. In this case, the edit cannot continue, and a ninth prompt message is displayed, such as "The network is abnormal, and the edit cannot be continued".

In some embodiments of the present disclosure, in response to the associated page of the first content is disconnected and the first content block is in the edit state when disconnected and the third control is called out, closing the third control and displaying a tenth prompt message. In some embodiments, the third control may be displayed in response to a specific operation, such as an option control displayed in response to a preset gesture operation. When the option control is called out and the first content is in the edit state, the user may desire to edit the first content block, but at this time, because the first content block is disconnected from the associated page of the first content, the edit cannot be continued, the tenth prompt message is displayed and the third control is closed, where the tenth prompt message may be, for example, "The network is abnormal, and edit is not allowed".

In some embodiments of the present disclosure, in response to the associated page of the first content is disconnected, not displaying the comment control after the second operation event is performed on the first content displayed in the first document and some or all of the information in the information input area. In some embodiments, when the associated page of the first content is not disconnected, the second operation event may be performed on the first content or the content in the information input area to call out the comment control. However, when the associated page of the first content is disconnected, the comment control is not displayed anymore, and the first content or the information in the information comment area cannot be commented. After the associated page of the first content is disconnected, the control identifier (such as the mouse) is in the non-disabled state, and operations such as copy may be performed.

In some embodiments of the present disclosure, the method further includes: in response to inputting the combination of the first preset identifier and the user name into the information input area or the comment information associated with content block, sending a first notification message to a user pointed to by the user name through a communication tool to which the user pointed to by the user name in the combination belongs, where the first notification message is used for jumping to a corresponding position of the combination after being triggered. In some embodiments, the first preset identifier may be a "@" symbol, a reminder is sent by inputting the combination of the first preset symbol and the user name, and the communication tool may be preset instant messaging software. The first document may send a message to the server after receiving the combination of the first preset identifier and the user name, so that the server may send the first notification message to the user pointed to by the user name in the communication tool. After the first notification message is triggered, the first document may be automatically opened or jumped to and positioned to the combination to facilitate user view. In some embodiments, the reminder may be sent to the user identified by the user name in the communication tool through a public account.

In some embodiments of the present disclosure, after the combination of the first preset identifier and the user name is input into the information input area or the comment information associated with the content block, whether the user pointed to by the user name meets a permission requirement associated with the first document is determined; and in response to the user meets the permission requirement, displaying the combination of the first preset identifier and the user name in a first style, and sending the first notification message; or in response to the user does not meet the permission requirement, displaying the combination of the second preset identifier and the user name in a second style, and not sending the first notification message, where the first style is different from the second style. In some embodiments, the first style may be a highlighted style, and the second style may be a non-highlighted style.

In some embodiments, the user pointed to by the user name in the combination may not have a permission to view the first document or the content block, so permission validation is required for the user name in the combination. If the permission requirement is met, the combination may be highlighted. If the permission requirement is not met, some or all of the content in the combination may be grayed, so that the user can directly determine whether the user in the combination will receive a notification message, thereby avoiding a situation where the user input the combination of the first preset identifier and the user name without notifying the corresponding user.

In some embodiments of the present disclosure, in response to a plurality of combinations of first preset identifiers and user names are input into an information input area in the first document or a piece of comment information, sending one piece of the first notification message, where the first notification message is used for positioning the first input combination among the plurality of combinations in the first document after being triggered.

In some embodiments, one content block may have one or more information input areas, and the combination of the first preset identifier and the user name is input into one information input area multiple times. In this case, positions of the combination are close, so only one notification is sent. A notification message is sent to the user pointed to by the user name, and the position of the first input combination is determined after the notification message is triggered.

In some embodiments of the present disclosure, sending n first notification messages in response to the same combination of the first preset identifier and the user name is input into n information input areas of one content block of the first document, n different information input areas of n content blocks, or n pieces of comment information, where the first notification message is used for jumping to the corresponding position of the combination after being triggered, one of the first notification messages corresponds to one of the combinations, and n is not less than 2.

In some embodiments, after the combination of the first preset identifier and the user name is input into different information input areas of one content block, different information input areas of different content blocks, or different comment information, one notification is performed every time the combination is input, and n notification messages are sent, where each notification message corresponds to the position of each combination and is used for jumping after being triggered.

In some embodiments of the present disclosure, after the first notification message is triggered, a display style of some or all of the content in the combination corresponding to the first notification message is changed until a duration after the style change arrives at a first preset duration. In some embodiments, some or all of the content in the combination may be highlighted and flickered for 150 ms, so that the user can quickly find the corresponding combination after triggering the first notification message. In some embodiments, the notification message may include, for example, names of the current user and the first document, so that the notified user knows who notified him and the document associated with the notification.

In some embodiments of the present disclosure, the acquiring first content in response to a first operation event on a first control in a first document includes: determining whether the current user has a third permission in response to the first operation event on the first control in the first document; and acquiring the first content in response to the current user has the third permission; or displaying a first preset interface in response to the current user does not have the third permission, where the first preset interface displays contact information of a target person, or displays a control for communication with the target person after being triggered.

Figure 11:
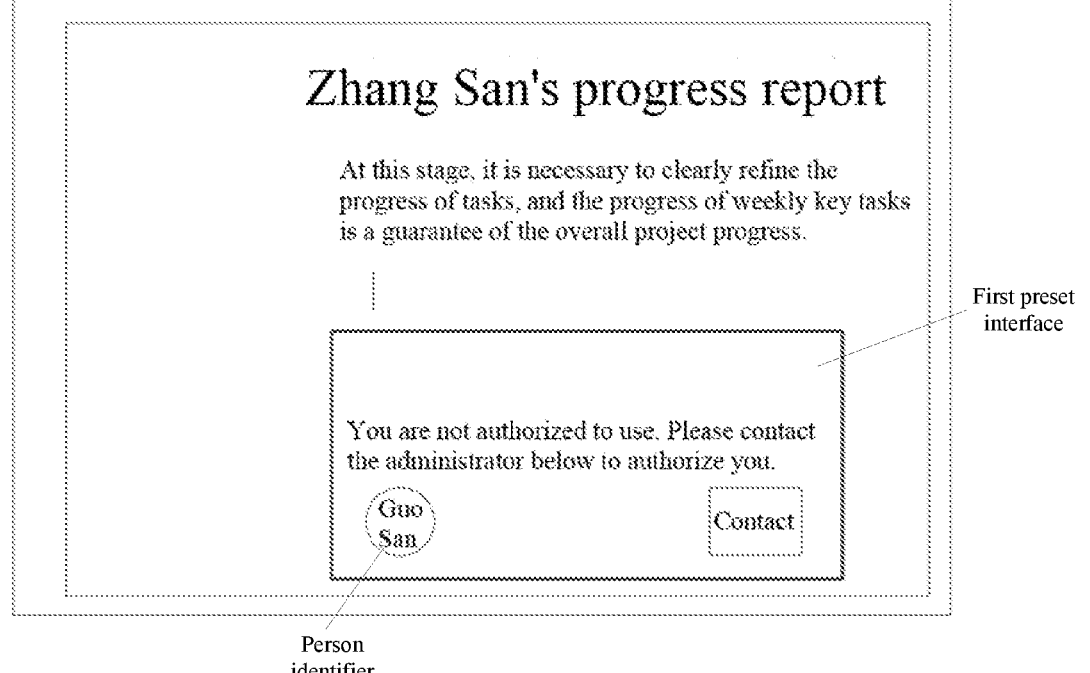
FIG. 11 is a schematic diagram of display of a first preset interface according to an embodiment of the present disclosure.

In some embodiments, the third permission may be a permission to use the first content or same type content of the first content. For example, when the first content is one or more pieces of task information, the third permission is a permission to use the task information. In response to the current user has the third permission, the first content may be acquired. Otherwise, the contact information of the target person or the control for communication with the target person is displayed. FIG. 11 shows the first preset interface displayed when the current user does not have the third permission, where the first preset interface displays a person identifier of the target person "Guo San" and the control used for contacting the target person (with a "Contact" box displayed inside). After the person identifier of the target person is triggered, a card of the target person may be displayed. After the control is triggered, a dialog with the target person may be called in a communication tool. The target person may be an administrator for the first content and the same type information of the first content, or an authorized administrator.

In some embodiments of the present disclosure, the method further includes: sharing the first document in response to a sharing operation on the first document, and determining whether the user who opens the first document has a permission to view the content block in response to the shared first document is opened; and in response to the user has the permission, displaying the first content block, or in response to the user does not have the permission, hiding the first content block.

In some embodiments, the first document may be shared, such as by sharing a link to the first document. When the shared first document is opened, permission validation is required for the user who opens the first document. If the user does not have the permission to view the first content block, the first content block is hidden, or if the user has the permission to view, the first content block is displayed.

In some embodiments of the present disclosure, the information processing method further includes: determining whether the current user is a target associated user of the first content; and displaying a synchronization control in response to the current user is the target associated user of the first content; otherwise, not display the synchronization control, where the synchronization control is used for synchronizing the information in the information input area of the first content block to an associated area of the content information corresponding to the second type information in the associated page of the first content after being triggered.

In some embodiments, the associated page of the first content may be located in the server, and the target associated user of the first content may be an owner of the first content. If the current user is the target associated user, when the current user views the first content, the synchronization control (a box displaying "Synchronize" in FIG. 12) is displayed, so that the user may choose to synchronize the information in the information input area to the associated page of the first content.

In some embodiments of the present disclosure, the information processing method further includes: displaying the synchronization control when the target associated user of the content block opens the first document in response to the current user is not the target associated user of the first content and the target associated user of the first content has a second preset permission for the first document.

In some embodiments, the second preset permission may be a view permission. In a case that the target associated user has the view permission for the first document, the target associated user can view the first document, and the synchronization control is displayed when the target associated user views the first document, so that the target associated user may choose to synchronize the content of the information input area in the first document to the associated page of the first document. In some embodiments, regardless of whether the target associated user has an edit permission for the first document, as long as the target associated user of the first content views the first document, the synchronization control is displayed and may be triggered.

In some embodiments of the present disclosure, the synchronization control displays third preset information after the eighth operation is performed thereon. In some embodiments, the eighth operation may be a mouse hover operation, the mouse is hovered over the synchronization control to display the third preset information, and the third preset information may be used for identifying the function of the synchronization control. In some embodiments, the first content information in the information input area of the first document is not automatically synchronized to the associated page of the first document before the synchronization control is triggered.

In some embodiments of the present disclosure, if the first content in the information input area is modified after the synchronization control is triggered, in response to triggering the synchronization control again, covering the information in the associated area of the content information corresponding to the second type information in the associated page of the first content with the modified first information, and displaying fourth preset information in the associated area of the content information corresponding to the second type information in the associated page of the first content. In some embodiments, after the content of the information input area is synchronized in the associated page of the first content, if the user modifies the first content of the information input area somewhere and triggers the synchronization control again, the modified first content is synchronized to the associated page of the first content, and the fourth preset information is displayed, where the fourth preset information may be used for identifying that the first content has been modified, and the fourth preset information may be displayed as "edited" in the associated page of the first content.

In some embodiments of the present disclosure, if a second content block carrying the first content is created in the first document, in response to a trigger operation on a synchronization control for the second content block, displaying information, which is in an information input area of the second content block, in the associated area of the content information corresponding to the second type information in the associated page of the first content block, and retaining the input information in the information input area of the first content block. In some embodiments, the second content block and the first content block are not the same content block, but carry the same first content. Therefore, the first content in the first content block and the first content in the second content block are associated to the same page. Therefore, after the synchronization control is triggered, the information in the information input areas of the first content block and the second content block is synchronized to the associated page of the first content, that is, the associated page of the first content displays the information in the information input areas of the first content block and the second content block simultaneously.

In some embodiments of the present disclosure, if n documents are created and each of the n documents has a third content block carrying the first content, in response to a trigger operation on a synchronization control for the third content block, displaying information, which is in an information input area of the third content block, in the associated area of the content information corresponding to the second type information in the associated page of the first content, and the input information in the information input area of the first content block in the first document is retained. In some embodiments, if the third content block carrying the first content is created in other documents, and the first content in each document is associated to the same associated page, the information in the information input area of each content block carrying the first content is required to be retained in the associated page of the first content. In some embodiments, n is not less than 1 or 2.

In some embodiments of the present disclosure, the synchronization control cannot be triggered in response to each information input area in the first content block where the first content is located is empty. In some embodiments, there is no content in the information input area at this time, so synchronization cannot be performed. In this case, the display of the synchronization control may be grayed.

In some embodiments of the present disclosure, the synchronization control is used for synchronizing the information in the non-empty information input area of the first content block to the associated page of the first content after being triggered, while the information in the empty information input area is not synchronized.

In some embodiments of the present disclosure, the synchronization control cannot be triggered in response to the communication with the associated page of the first content is disconnected. In some embodiments, when the communication with the associated page of the first content is disconnected, synchronization cannot be performed. In this case, a display style of the synchronization control may be changed to distinguish from a display style when the synchronization control can be triggered.

In some embodiments of the present disclosure, in response to the content information corresponding to the second type information stored in the associated page of the first content is modified, synchronizing the information in the information input area to the associated area of the content information corresponding to the modified second type information after the synchronization control is triggered. In some embodiments, if the user modifies the content corresponding to the second type information stored in the associated page of the first content, the content information corresponding to the modified second type information in the associated page of the first content is still considered to have an association relationship with the content information corresponding to the second type information before modification in the first document. In this case, the synchronization control may still be triggered to synchronize the content information.

Figures 12, 13:
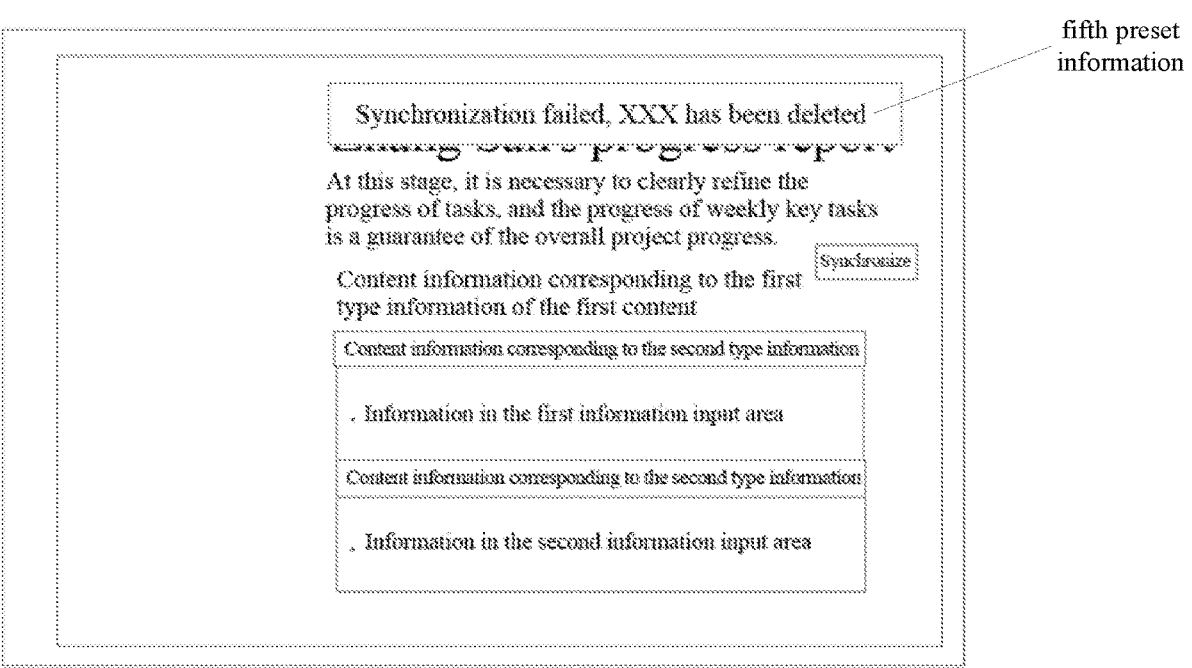
FIG. 12 is a schematic diagram of display of the first document when a synchronization control is displayed according to an embodiment of the present disclosure.
FIG. 13 is a schematic diagram of display of the first document when fifth preset information is displayed according to an embodiment of the present disclosure.

In some embodiments of the present disclosure, in response to the content information corresponding to the second type information stored in the associated page of the first content is deleted, displaying fifth preset information after the synchronization control is triggered. In some embodiments, after the content information corresponding to the second type information in the associated page of the first content is deleted, the content information associated with the deleted content information corresponding to the second type information in the first document may not be deleted. In this case, when the synchronization control is triggered, the information in the information input area of the content information associated with the deleted content information corresponding to the second type information in the first document cannot be synchronized to the associated page of the first content, so the synchronization fails. As shown in FIG. 13, the fifth preset information is displayed, where the fifth preset information may be used for indicating that the deleted content information corresponding to the second type information has been deleted.

In some embodiments of the present disclosure, the method further includes: determining a permission of the user who opens the first document in response to an opening operation on the first document; and displaying the preset placeholder in the information input area in response to the user who opens the first document has the second preset permission and there is no input content in the information input area of the content block in the first document; or displaying the content in the information input area in response to there is input content in the information input area of the content block in the first document.

In some embodiments, when the first document is opened, permission validation is performed on the user who opens the first document, and the second preset permission may be an edit permission. If the user has the second preset permission, the user may view and input content in the information input area. In response to there is no input content in the information input area, the preset placeholder is displayed to indicate that information may be input in the information input area. In response to there is input information in the information input area, the information is directly displayed.

In some embodiments of the present disclosure, the method further includes: determining a permission of the user who opens the first document in response to the opening operation on the first document; and hiding the preset placeholder in the information input area in response to the user who opens the first document has a third preset permission but does not have the second preset permission, and there is no input content in the information input area of the content block in the first document; or displaying the content in the information input area in response to there is input content in the information input area of the content block in the first document.

In some embodiments, the second preset permission may be the edit permission, and the third preset permission may be a view permission. If the user has the third preset permission but does not have the second preset permission, the user may view the content in the information input area, but the preset placeholder is not displayed when the information input area is empty, so as to prevent the user from mistakenly thinking that he has the permission to input information in the information input area. The preset placeholder may be text information, such as "Please input information".

Figures 14, 15:
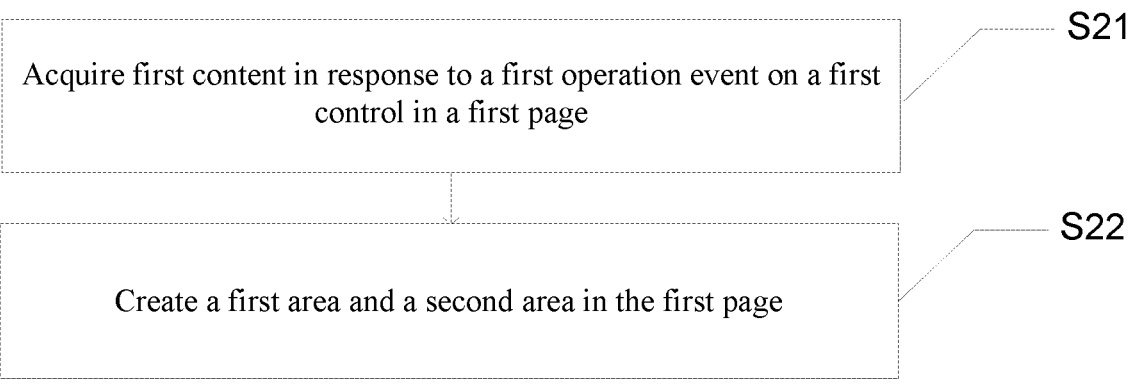
FIG. 14 is a flowchart of another information processing method according to an embodiment of the present disclosure.
FIG. 15 is a schematic structural diagram of an electronic device according to an embodiment of the present disclosure.

In some embodiments of the present disclosure, an information processing method is further provided, as shown in FIG. 14, including:

S21: Acquire first content in response to a first operation event on a first control in a first page.

In some embodiments, the description of step S11 also applies to step S21.

S22: Create a first area and a second area in the first page.

In some embodiments, the first area is used for displaying the first content, and the second area is used for inputting second content associated with the first content, where the second area is displayed at an associated position of the first area. In some embodiments of the present disclosure, the first area and the second area are created and directly displayed in the first page. By providing the second area, a user can easily input the second content associated with the first content, thereby improving association of input information. The first content may be task information, text information, or the like. The technical solution in this embodiment of the present disclosure may be combined with solutions in other embodiments, and the combined technical solutions should also be considered as solutions disclosed by the present disclosure.

In some embodiments of the present disclosure, the second area includes an information interaction control, the information interaction control is used for receiving first associated information of a first task information, and the second area is displayed at the associated position of the first area.

In some embodiments, type information in response to the first task information includes first type information and second type information, the first area includes a first subarea and a second subarea, the first subarea is used for displaying content information corresponding to the first type information, and the second subarea is used for displaying content information corresponding to the second type information.

In some embodiments, the second area is displayed at the associated position of the second subarea, where when the first task information includes a plurality of pieces of second type information, each piece of second type information corresponds to a respective second area, and input content received in each second area is associated with the second type information corresponding to the second area. In some embodiments, the first content comes from a second page, which is different from the first page. Thus, first content in the second page may be inserted into the first page, and a second area may be automatically generated for associated content of the first content, so as to achieve automatic association between the content input in the second area and the first content.

In some embodiments, in response to a synchronization command, the associated content received in the second area of the first page may be synchronized to a display area associated with the first content in the second page, so as to achieve automatic synchronization of cross-page associated information. Whether the associated information is input in the first page or the second page, the associated information can be automatically synchronized, which improves convenience. The synchronization may include overwriting original associated information or adding new associated information after retaining the original associated information.

In some embodiments, the first page and the second page may belong to different users, and the information content in the first area and the second area is processed based on a user permission of the first page for the second page and/or a user permission of the second page for the first page, as detailed in other embodiments of the present disclosure. Various embodiments of the present disclosure may be combined with each other in the absence of contradictions.

In some embodiments of the present disclosure, an information processing apparatus is further provided, including:

a determination unit, configured to acquire first content in response to a first operation event on a first control in a first document; and a control unit, configured to add the first content to the first document based on content information and type information of the first content, where the type information includes first type information and/or second type information, and the second type information has an association relationship with the first type information.

In some embodiments of the present disclosure, an information processing apparatus is further provided, including:

a determination module, configured to acquire first content in response to a first operation event on a first control in a first page; and a control module, configured to create a first area and a second area in the first page, where the first area is used for displaying the first content, and the second area is used for inputting second content associated with the first content, where the second area is displayed at an associated position of the first area.

The embodiment of the apparatus substantially corresponds to the embodiment of the method, so relevant parts may refer to the parts of the embodiment of the method. The embodiment of the apparatus described above is merely illustrative, where the modules illustrated as separate modules may or may not be separate. Some or all of the modules may be selected according to actual needs to achieve the objectives of the solutions of the embodiments. Those of ordinary skill in the art may understand and implement without any creative effort.

The methods and apparatuses of the present disclosure are described above based on the embodiments and application examples. In addition, the present disclosure further provides a terminal and a storage medium, which are described below.

Reference is made below to FIG. 15, which illustrates a schematic diagram of a structure of an electronic device (e.g., a terminal device or a server) 800 suitable for use in realizing embodiments of the present disclosure. Terminal devices in embodiments of the present disclosure may include, but are not limited to, mobile terminals such as cell phones, laptop computers, digital broadcast receivers, PDAs (personal digital assistants), PADs (tablet computers), PMPs (portable multimedia players), in-vehicle terminals (e.g., in-vehicle navigation terminals), and the like, as well as fixed terminals such as digital TVs, desktop computers, and the like. The electronic device illustrated in the drawings is merely an example and should not impose any limitation on the functions and scope of use of the embodiments of the present disclosure.

The electronic device 800 may include a processing apparatus (e.g., a central processor, a graphics processor, etc.) 801 that may perform various appropriate actions and processes based on programs stored in read-only memory (ROM) 802 or loaded from the storage apparatus 808 into random access memory (RAM) 803. Also stored in the RAM 803 are various programs and data necessary for the operation of the electronic device 800. The processing apparatus 801, the ROM 802, and the RAM 803 are connected to each other via a bus 804. An input/output (I/O) interface 805 is also connected to the bus 804.

Typically, the following devices may be connected to the I/O interface 805: an input apparatus 806 including, for example, a touch screen, a touch pad, a keyboard, a mouse, a camera, a microphone, an accelerometer, a gyroscope, and the like; an output apparatus 807 including, for example, a liquid crystal display (LCD), a loudspeaker, a vibrator, and the like; a storage apparatus 808 including, for example, a magnetic tape, a hard disk, and the like; and a communication apparatus 809. The communication apparatus 809 may allow the electronic device 800 to communicate wirelessly or wiredly with other devices to exchange data. Although electronic device 800 with various devices is illustrated in the figures, it should be understood that it is not required to implement or have all of the illustrated devices. More or fewer devices may alternatively be implemented or possessed.

In particular, according to embodiments of the present disclosure, the process described above with reference to the flowchart may be implemented as a computer software program. For example, embodiments of the present disclosure include a computer program product comprising a computer program carried on a computer-readable medium, the computer program comprising program code for performing the method shown in the flowchart. In such embodiments, the computer program may be downloaded and installed from a network via a communication apparatus 809, or from a storage apparatus 808, or from a ROM 802. In the event that the computer program is executed by the processing device 801, the above-described functions defined in the method of an embodiment of the present disclosure are performed.

It is noted that the computer-readable medium described above in the present disclosure may be a computer-readable signaling medium or a computer-readable storage medium or any combination thereof. The computer-readable storage medium may, for example, be—but is not limited to—a system, device, or apparatus, or device of electricity, magnetism, light, electromagnetism, infrared, or semiconductors, or any combination of the above. More specific examples of computer-readable storage media may include, but are not limited to: electrical connections having one or more wires, portable computer disks, hard disks, random access memory (RAM), read-only memory (ROM), erasable programmable read-only memory (EPROM or flash memory), optical fibers, portable compact disk read-only memories (CD-ROM), optical storage devices, magnetic memory device, or any suitable combination of the foregoing. In the context of the present disclosure, a computer-readable storage medium may be any tangible medium containing or storing a program that may be used by or in combination with an instruction execution system, apparatus, or device. And in the context of the present disclosure, a computer-readable signal medium may include a data signal propagated in a baseband or as part of a carrier that carries computer-readable program code. Such propagated data signals may take a variety of forms, including, but not limited to, electromagnetic signals, optical signals, or any suitable combination of the foregoing. The computer-readable signal medium may also be any computer-readable medium other than a computer-readable storage medium that sends, propagates, or transmits a program for use by, or in combination with, an instruction-executing system, apparatus, or device. The program code contained on the computer-readable medium may be transmitted using any suitable medium, including, but not limited to: wire, fiber optic cable, RF (radio frequency), etc., or any suitable combination of the foregoing.

In some implementations, the client, server may communicate utilizing any currently known or future developed network protocol such as HTTP (HyperText Transfer Protocol), and may be interconnected with digital data communications (e.g., communication networks) of any form or medium. Examples of communication networks include local area networks ("LANs"), wide area networks ("WANs"), inter-networks (e.g., the Internet), and end-to-end networks (e.g., ad hoc end-to-end networks), as well as any currently known or future developed networks.

The above-described computer-readable medium may be contained in the above-described electronic device; or it may be separate and not assembled into the electronic device.

The above-described computer-readable medium carries one or more programs that, when the above-described one or more programs are executed by the electronic device, cause the electronic device to perform the above-described method of the present disclosure.

Computer program code for performing the operations of the present disclosure may be written in one or more programming languages or combinations thereof, including object-oriented programming languages—such as Java, Smalltalk, C++—and conventional procedural programming languages—such as the "C" language or the like. "C" or similar programming languages. The program code may be executed entirely on the user's computer, partially on the user's computer, as a stand-alone software package, partially on the user's computer and partially on a remote computer, or entirely on a remote computer or server. In the case involving a remote computer, the remote computer may be connected to the user computer via any kind of network—including a local area network (LAN) or a wide area network (WAN)—or, alternatively, it may be connected to an external computer (e.g., by utilizing an Internet service provider to connect via the Internet).

The flowcharts and block diagrams in the accompanying drawings illustrate the architecture, functionality, and operation of systems, methods, and computer program products that may be implemented in accordance with various embodiments of the present disclosure. At this point, each box in the flowcharts or block diagrams may represent a module, program segment, or portion of code that contains one or more executable instructions for implementing a specified logical function. It should also be noted that in some implementations as replacements, the functions labeled in the boxes may also occur in a different order than those labeled in the accompanying drawings. For example, two consecutively represented boxes may actually be executed substantially in parallel, and they may sometimes be executed in reverse order, depending on the function involved. It is also noted that each of the boxes in the block diagrams and/or flowcharts, and combinations of the boxes in the block diagrams and/or flowcharts, may be implemented with a specialized hardware-based system that performs the specified function or operation, or may be implemented with a combination of specialized hardware and computer instructions.

Units described as being involved in embodiments of the present disclosure may be implemented by way of software or may be implemented by way of hardware. Among other things, the name of a unit does not constitute a limitation of the unit itself in a given situation.

The functions described above herein may be performed, at least in part, by one or more hardware logic components. For example, non-limitingly, exemplary types of hardware logic components that may be used include: field programmable gate arrays (FPGAs), application-specific integrated circuits (ASICs), application-specific standard products (ASSPs), systems-on-chip (SOCs), complex programmable logic devices (CPLDs), and the like.

In the context of the present disclosure, a machine-readable medium may be a tangible medium that may contain or store a program for use by or in conjunction with an instruction execution system, device, or apparatus. The machine-readable medium may be a machine-readable signal medium or a machine-readable storage medium. The machine-readable medium may include, but is not limited to, an electronic, magnetic, optical, electromagnetic, infrared, or semiconductor system, device, or apparatus, or any suitable combination of the foregoing. More specific examples of machine-readable storage media would include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination of the foregoing. any suitable combination of the above.

According to one or more embodiments, the present disclosure provides an information processing method, comprising:

acquiring first content in response to a first operation event on a first control in a first document; and adding the first content to the first document based on content information and type information of the first content, wherein the type information comprises first type information and/or second type information, and the second type information has an association relationship with the first type information.

According to one or more embodiments, the present disclosure provides an information processing method, a first content block is created in a main body area of the first document, the first content block being used for carrying the content information of the first content.

According to one or more embodiments, the present disclosure provides an information processing method, wherein in response to the type information comprising the first type information and the second type information, content information corresponding to the first type information is displayed in a first area of the first content block, and content information corresponding to the second type information is displayed in a second area of the first content block.

According to one or more embodiments, the present disclosure provides an information processing method, wherein before acquiring first content in response to a first operation event on a first control in a first document, the method further comprises:

determining permission information of a user to whom a current user accessing the first document belongs in response to a trigger operation on a second control in the first document;

displaying the first control in response to the user to whom the current user belongs has a first permission; and/or not display the first control in response to the user to whom the current user belongs does not have the first permission.

According to one or more embodiments, the present disclosure provides an information processing method, wherein before acquiring first content in response to a first operation event on a first control in a first document, the method comprises:

determining permission information of the current user accessing the first document and permission information of an owner of the first document in response to the trigger operation on the second control in the first document;

not display the first control in response to the current user has a second permission and the owner of the first document does not have the second permission; and/or not display the first control in response to the current user does not have the second permission and the owner of the first document has the second permission; and/or displaying the first control in response to both the current user and the owner of the first document have the second permission.

According to one or more embodiments, the present disclosure provides an information processing method, wherein the acquiring first content in response to a first operation event on a first control in a first document comprises:

displaying an information selection control in response to the trigger operation on the first control in the first document; and acquiring the first content in response to a selection operation on first content information displayed by the information selection control.

According to one or more embodiments, the present disclosure provides an information processing method, wherein a third control displaying in the information selection control, the third control is used for selecting a time period, and the first content information displayed by the information selection control is associated with the currently selected time period in the third control.

According to one or more embodiments, the present disclosure provides an information processing method, wherein the information selection control has a first position inside, and a display style of the first content information displayed in the first position is different from that of the first content information displayed in other positions in the information selection control.

According to one or more embodiments, the present disclosure provides an information processing method, wherein the time period of current time is selected by default in the third control; and/or in response to there is no first content information associated with the selected time period in the third control, displaying first preset information in the information selection control; and/or in response to there is no first content information associated with the selected time period in the third control, a confirmation control in the information selection control is unavailable; and/or a first type time period is hidden in the third control, a first marker is displayed in an associated area of a second type time period displayed in the third control, and second preset information is displayed within the second type time period displayed in the third control after a second operation is performed.

According to one or more embodiments, the present disclosure provides an information processing method, wherein after the information selection control is displayed, in response to a search condition input in the first document or information selection control, the associated first content information is searched according to the input search condition and the searched first content information is displayed in the information selection control.

According to one or more embodiments, the present disclosure provides an information processing method, wherein the input search condition is received in a content area associated with an area where the first content is located in the first document.

According to one or more embodiments, the present disclosure provides an information processing method, wherein the searching the associated first content information according to the input search condition comprises:

obtaining a target user who satisfies the search condition, and determining the first content information associated with the target user;

determining whether the current user has a preset permission for the first content information associated with the target user; and displaying first content information for which the current user has the preset permission in the first content information associated with the target user.

According to one or more embodiments, the present disclosure provides an information processing method, wherein displaying a first prompt message in the information selection control in response to there is no first content information associated with the target user who satisfies the search condition or the current user does not have the preset permission for the first content information of the target user; and/or displaying a third prompt message in the search result in response to the target user does not have the second permission.

According to one or more embodiments, the present disclosure provides an information processing method, wherein the displaying the first content information in the information selection control comprises: displaying the content information corresponding to the first type information in the first content information in the information selection control, and hiding the content information corresponding to the second type information in the first content information.

According to one or more embodiments, the present disclosure provides an information processing method, wherein the acquiring the first content in response to a selection operation on first content information displayed by the information selection control comprises:

in response to the selection operation on the content information corresponding to the first type information, determining whether the selected first type information has associated second type information;

in response to the selected first type information has the associated second type information, determining that the first content information to which the first type information belongs is the first content; and/or in response to the selected first type information does not have the associated second type information, displaying a fourth prompt message and maintaining the display of the information selection control.

According to one or more embodiments, the present disclosure provides an information processing method, wherein a third control displaying in the information selection control, the third control is used for selecting a time period, the first content information displayed by the information selection control is associated with the time period selected in the third control, and the first document or the search condition input in the information selection control is retained in response to the time period selected in the third control is switched.

According to one or more embodiments, the present disclosure provides an information processing method, further comprising:

in response to the time period selected in the third control is switched, displaying a search result corresponding to the switched time period.

According to one or more embodiments, the present disclosure provides an information processing method, further comprising:

in response to a preset trigger operation on the first content, opening a second page carrying the first content or a login page for logging in to the second page.

According to one or more embodiments, the present disclosure provides an information processing method, wherein in response to the first document is a first type document, opening an associated page of the first content and positioning the content information corresponding to the first type information in the associated page of the first content after the content information corresponding to the first type information displayed in the first document is triggered; and/or in response to the first document is a second type document and the current user has logged in to an account, opening the second page and positioning to the content information corresponding to the first type information in the second page after the first type information displayed in the first document is triggered; and/or in response to the first document is the second type document and the current user has not logged in to the account, opening the login page for the second page after the first type information displayed in the first document is triggered.

According to one or more embodiments, the present disclosure provides an information processing method, wherein an information input area associated with the content information corresponding to the second type information is displayed in the second area of the first content block, wherein the information input area is used for inputting information.

According to one or more embodiments, the present disclosure provides an information processing method, wherein a comment control is displayed after a second operation event is performed on the content information corresponding to the first type information displayed in the first document, the content information corresponding to the second type information, or the information in the information input area, wherein the comment control is used for inputting comment information about the information on which the second operation event is performed; and/or the information in the information input area comprises at least one of the following: text information, image information, title information, bold information, italic information, underlined information, an ordered list, an unordered list, a task list, a hyperlink, a combination of a first preset identifier and a user name, and a combination of a second preset identifier and a document name, wherein the combination of the first preset identifier and the user name is used for reminding a user pointed to by the user name, and the combination of the second preset identifier and the document name is used for reminding a document pointed to by the document name.

According to one or more embodiments, the present disclosure provides an information processing method, wherein in response to a content block in the first document is cut and pasted into the first document, retaining comment information of the cut content block in the first pasted content block after cutting, and not retaining the comment information of the cut content block in the nth time pasted content block after cutting, wherein n is not less than 2.

According to one or more embodiments, the present disclosure provides an information processing method, comprising:

determining target document content in the first document in response to a third operation event on document content of the first document; and in response to a fourth operation event on the first document, determining paste content according to the current user, a second user to which the second document belongs, and the target document content, and pasting the paste content into the second document.

According to one or more embodiments, the present disclosure provides an information processing method, wherein the determining paste content according to the current user, a second user to which the second document belongs, and the target document content comprises:

in response to the current user and the second user are the same user, the paste content is the target document content;

in response to the current user and the second user are two different users belonging to the same user, the paste content is the target document content; or in response to the current user and the second user belong to different users, the paste content comprises: other document content in the target document content except the content block where the first content is located, and/or the paste content comprises: a fifth prompt message, which is used for replacing the first content.

According to one or more embodiments, the present disclosure provides an information processing method, further comprising:

in response to a paste operation in the information input area, determining whether the pasted content is content of a preset type, and displaying a sixth prompt message in response to the pasted content is not the content of the preset type; or pasting the pasted content into the information input area in response to the pasted content is the content of the preset type.

According to one or more embodiments, the present disclosure provides an information processing method, further comprising:

in response to a fifth operation event on the first document, creating a third document according to the current user, the first user to which the first document belongs, and the document content of the first document.

According to one or more embodiments, the present disclosure provides an information processing method, wherein the creating a third document according to the current user, the first user to which the first document belongs, and the document content of the first document comprises:

in response to the current user and the first user are the same user, creating the third document, wherein the third document is a copy of the first document;

in response to the current user and the first user are two different users belonging to the same user, creating the third document, wherein the third document is a copy of the first document; or in response to the current user and the first user are two users belonging to two different users, creating the third document, wherein the document content of the first document comprises: the content block carrying the first content or carrying same type information of the first content, and other document content; and document content of the third document comprises: the other document content and the sixth prompt message, wherein the sixth prompt message is used for replacing the first content or the same type information of the first content.

According to one or more embodiments, the present disclosure provides an information processing method, further comprising:

in response to an edit operation on the content in the information input area of the content block in the first document, displaying first edit content in the information input area and sending first data to a first terminal to enable the first document opened on the first terminal to display the first edit content in real time, wherein the content block is used for carrying the first content or the same type information carrying the first content; and/or, in response to receiving second data sent by the first terminal, displaying second edit content in the content block of the first document according to the second data.

According to one or more embodiments, the present disclosure provides an information processing method, wherein in response to a first information input area in the content block of the first document is in an edit state, the first information input area of the first document opened at a second terminal is in a non-editable state, or in response to the first information input area of the first document is in a non-edit state, the first information input area of the first document opened at the second terminal is in an editable state; and/or in response to the first information input area in the content block of the first document is in the edit state, displaying a lock identifier in an associated area of the first information input area of the first document opened at the second terminal, or in response to the first information input area of the first document is in the non-edit state, hiding the lock identifier; and/or when the first information input area of the first document is in the edit state, a display style of the first information input area of the first document opened at the second terminal is different from that of the first information input area of the first document opened at the second terminal when the first information input area of the first document is in the non-edit state; and/or when the first information input area of the first document is in the non-edit state, displaying a seventh prompt message in response to a sixth operation performed on the first information input area of the first document opened at the second terminal.

According to one or more embodiments, the present disclosure provides an information processing method, wherein in response to the first information input area in the content block of the first document is in the edit state, the first information input area in the first document opened on a third terminal is in the editable state.

According to one or more embodiments, the present disclosure provides an information processing method, wherein a communication connection is established in advance with the associated page of the first content; in response to the associated page of the first content is connected, displaying a preset placeholder in the information input area where content is not input in the first content block; in response to the associated page of the first content is disconnected, hiding the preset placeholder; and/or, in response to the associated page of the first content is disconnected and the first content block is in the non-edit state when disconnected, displaying an eighth prompt message when a seventh operation is performed on the first content block; and/or in response to the associated page of the first content is disconnected and the first content block is in the edit state when disconnected and the third control is not called out, displaying a ninth prompt message; and/or in response to the associated page of the first content is disconnected and the first content block is in the edit state when disconnected and the third control is called out, closing the third control and displaying a tenth prompt message; and/or in response to the associated page of the first content is disconnected, not displaying the comment control after the second operation event is performed on the first content displayed in the first document and some or all of the information in the information input area.

According to one or more embodiments, the present disclosure provides an information processing method, further comprising:

in response to inputting the combination of the first preset identifier and the user name into the information input area or the comment information associated with content block, sending a first notification message to a user pointed to by the user name through a communication tool to which the user pointed to by the user name in the combination belongs, wherein the first notification message is used for jumping to a corresponding position of the combination after being triggered.

According to one or more embodiments, the present disclosure provides an information processing method, wherein after the combination of the first preset identifier and the user name is input into the information input area or the comment information associated with the content block, whether the user pointed to by the user name meets a permission requirement associated with the first document is determined; and in response to the user meets the permission requirement, displaying the combination of the first preset identifier and the user name in a first style, and sending the first notification message; or in response to the user does not meet the permission requirement, displaying the combination of the second preset identifier and the user name in a second style, and not sending the first notification message, wherein the first style is different from the second style.

According to one or more embodiments, the present disclosure provides an information processing method, wherein in response to a plurality of combinations of first preset identifiers and user names are input into an information input area in the first document or a piece of comment information, sending one piece of the first notification message, wherein the first notification message is used for positioning the first input combination among the plurality of combinations in the first document after being triggered; and/or sending n first notification messages are sent in response to the same combination of the first preset identifier and the user name is input into n information input areas of one content block of the first document, n different information input areas of n content blocks, or n pieces of comment information, wherein the first notification message is used for jumping to the corresponding position of the combination after being triggered, one of the first notification messages corresponds to one of the combinations, and n is not less than 2; and/or after the first notification message is triggered, a display style of some or all of the content in the combination corresponding to the first notification message is changed until a duration after the style change arrives at a first preset duration.

According to one or more embodiments, the present disclosure provides an information processing method, wherein the acquiring first content in response to a first operation event on a first control in a first document comprises:

determining whether the current user has a third permission in response to the first operation event on the first control in the first document; and acquiring the first content in response to the current user has the third permission; or displaying a first preset interface in response to the current user does not have the third permission, wherein the first preset interface displays contact information of a target person, or the first preset interface displays a control for communication with the target person after being triggered.

According to one or more embodiments, the present disclosure provides an information processing method, further comprising:

sharing the first document in response to a sharing operation on the first document, and determining whether the user who opens the first document has a permission to view the content block in response to the shared first document is opened; and in response to the user has the permission, displaying the first content block, or in response to the user does not have the permission, hiding the first content block.

According to one or more embodiments, the present disclosure provides an information processing method, further comprising:

determining whether the current user is a target associated user of the first content; and displaying a synchronization control in response to the current user is the target associated user of the first content; otherwise, not display the synchronization control, wherein the synchronization control is used for synchronizing the information in the information input area of the first content block to an associated area of the content information corresponding to the second type information in the associated page of the first content after being triggered.

According to one or more embodiments, the present disclosure provides an information processing method, further comprising:

displaying the synchronization control when the target associated user of the content block opens the first document in response to the current user is not the target associated user of the first content, and the target associated user of the first content has a second preset permission for the first document.

According to one or more embodiments, the present disclosure provides an information processing method, wherein the synchronization control displays third preset information after the eighth operation is performed thereon; and/or if first information in the information input area is modified after the synchronization control is triggered, in response to triggering the synchronization control again, covering the information in the associated area of the content information corresponding to the second type information in the associated page of the first content with the modified first information, and displaying fourth preset information in the associated area of the content information corresponding to the second type information in the associated page of the first content; and/or if a second content block carrying the first content is created in the first document, in response to a trigger operation on a synchronization control for the second content block, displaying information, which is in an information input area of the second content block, in the associated area of the content information corresponding to the second type information in the associated page of the first content block, and retaining the input information in the information input area of the first content block; and/or if n documents are created and each of the n documents has a third content block carrying the first content, in response to a trigger operation on a synchronization control for the third content block, displaying information, which is in an information input area of the third content block, in the associated area of the content information corresponding to the second type information in the associated page of the first content, and the input information in the information input area of the first content block in the first document is retained.

According to one or more embodiments, the present disclosure provides an information processing method, wherein the synchronization control cannot be triggered in response to each information input area in the first content block where the first content is located is empty; and/or the synchronization control is used for synchronizing the information in the non-empty information input area of the first content block to the associated page of the first content after being triggered, while the information in the empty information input area is not synchronized; and/or the synchronization control cannot be triggered in response to the communication with the associated page of the first content is disconnected; and/or in response to the content information corresponding to the second type information stored in the associated page of the first content is modified, synchronizing the information in the information input area to the associated area of the content information corresponding to the modified second type information after the synchronization control is triggered; and/or in response to the content information corresponding to the second type information stored in the associated page of the first content is deleted, displaying fifth preset information after the synchronization control is triggered.

According to one or more embodiments, the present disclosure provides an information processing method, further comprising:

determining a permission of the user who opens the first document in response to an opening operation on the first document; and displaying the preset placeholder in the information input area in response to the user who opens the first document has the second preset permission and there is no input content in the information input area of the content block in the first document; or displaying the content in the information input area in response to there is input content in the information input area of the content block in the first document; or hiding the preset placeholder in the information input area in response to the user who opens the first document has a third preset permission but does not have the second preset permission, and there is no input content in the information input area of the content block in the first document; or displaying the content in the information input area in response to there is input content in the information input area of the content block in the first document.

According to one or more embodiments, the present disclosure provides an information processing method, comprising:

acquiring first content in response to a first operation event on a first control in a first page; and creating a first area and a second area in the first page, wherein the first area is used for displaying the first content, and the second area is used for inputting second content associated with the first content, wherein the second area is displayed at an associated position of the first area.

According to one or more embodiments, the present disclosure provides an information processing method, wherein the first content comes from a second page, which is different from the first page.

According to one or more embodiments, the present disclosure provides an information processing apparatus, comprising:

a determination unit, configured to acquire first content in response to a first operation event on a first control in a first document; and a control unit, configured to add the first content to the first document based on content information and type information of the first content, wherein the type information comprises first type information and/or second type information, and the second type information has an association relationship with the first type information.

According to one or more embodiments, the present disclosure provides an information processing apparatus, comprising:

a determination module, configured to acquire first content in response to a first operation event on a first control in a first page; and a control module, configured to create a first area and a second area in the first page, wherein the first area is used for displaying the first content, and the second area is used for inputting second content associated with the first content, wherein the second area is displayed at an associated position of the first area.

According to one or more embodiments, the present disclosure provides a terminal, comprising:

at least one memory and at least one processor, wherein the at least one memory is configured to store program code, and the at least one processor is configured to call the program code stored in the at least one memory to perform the method according to any one of the method above.

According to one or more embodiments, the present disclosure provides a storage medium, the storage medium storing program code, and the program code being used for performing the method according to any one of the method above.

The above description is only a preferred embodiment of the present disclosure and an illustration of the technical principles utilized. It should be understood by those skilled in the art that the scope of disclosure involved in the present disclosure is not limited to technical solutions formed by a particular combination of the above technical features, but also covers other technical solutions formed by any combination of the above technical features or their equivalent features without departing from the above disclosed concept. For example, a technical solution formed by interchanging the above-mentioned features with technical features having similar functions disclosed in the present disclosure (but not limited to).

Furthermore, although the operations are depicted using a particular order, this should not be construed as requiring that the operations be performed in the particular order shown or in a sequential order of execution. Multitasking and parallel processing may be advantageous in certain environments. Similarly, while several specific implementation details are included in the above discussion, these should not be construed as limiting the scope of the present disclosure. Certain features described in the context of separate embodiments may also be implemented in combination in a single embodiment. Conversely, various features described in the context of a single embodiment may also be implemented in multiple embodiments, either individually or in any suitable sub-combination.

Although the present subject matter has been described using language specific to structural features and/or method logic actions, it should be understood that the subject matter defined in the appended claims is not necessarily limited to the particular features or actions described above. Rather, the particular features and actions described above are merely exemplary forms of realizing the claims.

What is claimed is:

1. An information processing method, comprising:

displaying a first control in an interface where a first document is displayed for a user, wherein the first document comprises an online document carrying content information, and wherein the first control is configured to trigger adding additional content to the first document;

determining first content in response to a first operation event on the first control;

creating a content block in a main body area of the first document, wherein the content block is configured to carry content to be added in the first document, and wherein the content block comprises a plurality of preset areas to display different types of data in the content to be added in the first document;

adding the first content to the first document based on content information and type information of the first content, wherein the type information comprises first type information and second type information, and the second type information has an association relationship with the first type information;

automatically displaying the first content in the created content block to distinguish from other content in the first document, wherein the first content added to the first document belongs to another user, the user has a permission to access the first content, and the automatically displaying the first content in the created content block comprises:

automatically displaying content corresponding to the first type information in a first area among the plurality of preset areas of the created content block, and automatically displaying content corresponding to the second type information in a second area among the plurality of preset areas of the created content block; and displaying a synchronization control in the first document, wherein the synchronization control is configured to synchronize the first content in the first document with a page from which the first content sources.

2. The method according to claim 1, wherein before acquiring first content in response to a first operation event on a first control in a first document, the method further comprises:

determining permission information of a user to whom a current user accessing the first document belongs in response to a trigger operation on a second control in the first document;

displaying the first control in response to the user to whom the current user belongs has a first permission; and/or not display the first control in response to the user to whom the current user belongs does not have the first permission;

and/or, before acquiring first content in response to a first operation event on a first control in a first document, the method comprises:

determining permission information of the current user accessing the first document and permission information of an owner of the first document in response to the trigger operation on the second control in the first document;

not display the first control in response to the current user has a second permission and the owner of the first document does not have the second permission; and/or not display the first control in response to the current user does not have the second permission and the owner of the first document has the second permission; and/or displaying the first control in response to both the current user and the owner of the first document have the second permission.

3. The method according to claim 1, wherein the acquiring first content in response to a first operation event on a first control in a first document comprises:

displaying an information selection control in response to the trigger operation on the first control in the first document; and acquiring the first content in response to a selection operation on first content information displayed by the information selection control.

4. The method according to claim 3, wherein the displaying the first content information in the information selection control comprises: displaying the content information corresponding to the first type information in the first content information in the information selection control, and hiding the content information corresponding to the second type information in the first content information.

5. The method according to claim 4, wherein the acquiring the first content in response to a selection operation on first content information displayed by the information selection control comprises:

in response to the selection operation on the content information corresponding to the first type information, determining whether the selected first type information has associated second type information;

in response to the selected first type information has the associated second type information, determining that the first content information to which the first type information belongs is the first content; and/or in response to the selected first type information does not have the associated second type information, displaying a fourth prompt message and maintaining the display of the information selection control.

6. The method according to claim 1, further comprising:

in response to a preset trigger operation on the first content, opening a second page carrying the first content or a login page for logging in to the second page.

7. The method according to claim 6, wherein in response to the first document is a first type document, opening an associated page of the first content and positioning the content information corresponding to the first type information in the associated page of the first content after the content information corresponding to the first type information displayed in the first document is triggered; and/or in response to the first document is a second type document and the current user has logged in to an account, opening the second page and positioning to the content information corresponding to the first type information in the second page after the first type information displayed in the first document is triggered; and/or in response to the first document is the second type document and the current user has not logged in to the account, opening the login page for the second page after the first type information displayed in the first document is triggered.

8. The method according to claim 1, wherein an information input area associated with the content information corresponding to the second type information is displayed in the second area of the first content block, wherein the information input area is used for inputting information.

9. The method according to claim 8, wherein a comment control is displayed after a second operation event is performed on the content information corresponding to the first type information displayed in the first document, the content information corresponding to the second type information, or the information in the information input area, wherein the comment control is used for inputting comment information about the information on which the second operation event is performed; and/or the information in the information input area comprises at least one of the following: text information, image information, title information, bold information, italic information, underlined information, an ordered list, an unordered list, a task list, a hyperlink, a combination of a first preset identifier and a user name, and a combination of a second preset identifier and a document name, wherein the combination of the first preset identifier and the user name is used for reminding a user pointed to by the user name, and the combination of the second preset identifier and the document name is used for reminding a document pointed to by the document name.

10. The method according to claim 8, wherein in response to a first information input area in the content block of the first document is in an edit state, the first information input area of the first document opened at a second terminal is in a non-editable state, or in response to the first information input area of the first document is in a non-edit state, the first information input area of the first document opened at the second terminal is in an editable state; and/or in response to the first information input area in the content block of the first document is in the edit state, displaying a lock identifier in an associated area of the first information input area of the first document opened at the second terminal, or in response to the first information input area of the first document is in the non-edit state, hiding the lock identifier; and/or when the first information input area of the first document is in the edit state, a display style of the first information input area of the first document opened at the second terminal is different from that of the first information input area of the first document opened at the second terminal when the first information input area of the first document is in the non-edit state; and/or when the first information input area of the first document is in the non-edit state, displaying a seventh prompt message in response to a sixth operation performed on the first information input area of the first document opened at the second terminal.

11. The method according to claim 8, wherein a communication connection is established in advance with the associated page of the first content; in response to the associated page of the first content is connected, displaying a preset placeholder in the information input area where content is not input in the first content block; in response to the associated page of the first content is disconnected, hiding the preset placeholder; and/or, in response to the associated page of the first content is disconnected and the first content block is in the non-edit state when disconnected, displaying an eighth prompt message when a seventh operation is performed on the first content block; and/or in response to the associated page of the first content is disconnected and the first content block is in the edit state when disconnected and the third control is not called out, displaying a ninth prompt message; and/or in response to the associated page of the first content is disconnected and the first content block is in the edit state when disconnected and the third control is called out, closing the third control and displaying a tenth prompt message; and/or in response to the associated page of the first content is disconnected, not displaying the comment control after the second operation event is performed on the first content displayed in the first document and some or all of the information in the information input area.

12. The method according to claim 1, further comprising: determining whether the user is a target associated user of the first content; and

displaying the synchronization control in response to the user is the target associated user of the first content; otherwise, not display the synchronization control.

13. The method according to claim 12, further comprising:

displaying the synchronization control when the target associated user of the content block opens the first document in response to the current user is not the target associated user of the first content, and the target associated user of the first content has a second preset permission for the first document;

and/or;

the synchronization control displays third preset information after the eighth operation is performed thereon; and/or if first information in the information input area is modified after the synchronization control is triggered, in response to triggering the synchronization control again, covering the information in the associated area of the content information corresponding to the second type information in the associated page of the first content with the modified first information, and displaying fourth preset information in the associated area of the content information corresponding to the second type information in the associated page of the first content; and/or if a second content block carrying the first content is created in the first document, in response to a trigger operation on a synchronization control for the second content block, displaying information, which is in an information input area of the second content block, in the associated area of the content information corresponding to the second type information in the associated page of the first content block, and retaining the input information in the information input area of the first content block; and/or if n documents are created and each of the n documents has a third content block carrying the first content, in response to a trigger operation on a synchronization control for the third content block, displaying information, which is in an information input area of the third content block, in the associated area of the content information corresponding to the second type information in the associated page of the first content, and the input information in the information input area of the first content block in the first document is retained.

14. The method according to claim 12, wherein the synchronization control cannot be triggered in response to each information input area in the first content block where the first content is located is empty; and/or the synchronization control is used for synchronizing the information in the non-empty information input area of the first content block to the associated page of the first content after being triggered, while the information in the empty information input area is not synchronized; and/or the synchronization control cannot be triggered in response to the communication with the associated page of the first content is disconnected; and/or in response to the content information corresponding to the second type information stored in the associated page of the first content is modified, synchronizing the information in the information input area to the associated area of the content information corresponding to the modified second type information after the synchronization control is triggered; and/or in response to the content information corresponding to the second type information stored in the associated page of the first content is deleted, displaying fifth preset information after the synchronization control is triggered.

15. The method according to claim 1, further comprising:

determining a permission of the user who opens the first document in response to an opening operation on the first document; and displaying the preset placeholder in the information input area in response to the user who opens the first document has the second preset permission and there is no input content in the information input area of the content block in the first document; or displaying the content in the information input area in response to there is input content in the information input area of the content block in the first document; or hiding the preset placeholder in the information input area in response to the user who opens the first document has a third preset permission but does not have the second preset permission, and there is no input content in the information input area of the content block in the first document; or displaying the content in the information input area in response to there is input content in the information input area of the content block in the first document.

16. An information processing method, comprising:

displaying a first control in an interface where a first document is displayed for a user, wherein the first document comprises an online document carrying content information, and wherein the first control is configured to trigger adding additional content to the first document;

determining first content in response to a first operation event on the first control;

creating a content block in a main body area of the first document, wherein the content block is configured to carry content to be added in the first document, and wherein the content block comprises a plurality of preset areas to display different types of data in the content to be added in the first document;

adding the first content to the first document and automatically displaying the first content in a first area of the created content block, wherein the first content added to the first document belongs to another user, and the user has a permission to access the first content;

displaying a second area in a position associated with the first area, wherein the second area is configured to input second content associated with the first content, and wherein the second area is among the plurality of preset areas of the created content block; and displaying a synchronization control in the first document, wherein the synchronization control is configured to synchronize the first content in the first document with a page from which the first content sources.

17. The method according to claim 16, wherein the first content comes from a second page, which is different from the first document.

18. A device, comprising:

at least one memory and at least one processor, wherein the at least one memory is configured to store program code, and the at least one processor is configured to call the program code stored in the at least one memory to perform operations comprising:

displaying a first control in an interface where a first document is displayed for a user, wherein the first document comprises an online document carrying content information, and wherein the first control is configured to trigger adding additional content to the first document;

determining first content in response to a first operation event on the first control;

creating a content block in a main body area of the first document, wherein the content block is configured to carry content to be added in the first document, and wherein the content block comprises a plurality of preset areas to display different types of data in the content to be added in the first document;

adding the first content to the first document based on content information and type information of the first content, wherein the type information comprises first type information and second type information, and the second type information has an association relationship with the first type information;

automatically displaying the first content in the created content block to distinguish from other content in the first document, wherein the first content added to the first document belongs to another user, the user has a permission to access the first content, and the automatically displaying the first content in the created content block comprises:

automatically displaying content corresponding to the first type information in a first area among the plurality of preset areas of the created content block, and automatically displaying content corresponding to the second type information in a second area among the plurality of preset areas of the created content block; and displaying a synchronization control in the first document, wherein the synchronization control is configured to synchronize the first content in the first document with a page from which the first content sources.

19. A non-transitory computer-readable storage medium storing instructions which, when executed by a processor, cause the processor to perform operations comprising:

displaying a first control in an interface where a first document is displayed for a user, wherein the first document comprises an online document carrying content information, and wherein the first control is configured to trigger adding additional content to the first document;

determining first content in response to a first operation event on the first control;

creating a content block in a main body area of the first document, wherein the content block is configured to carry content to be added in the first document, and wherein the content block comprises a plurality of preset areas to display different types of data in the content to be added in the first document;

adding the first content to the first document based on content information and type information of the first content, wherein the type information comprises first type information and second type information, and the second type information has an association relationship with the first type information;

automatically displaying the first content in the created content block to distinguish from other content in the first document, wherein the first content added to the first document belongs to another user, the user has a permission to access the first content, and the automatically displaying the first content in the created content block comprises:

automatically displaying content corresponding to the first type information in a first area among the plurality of preset areas of the created content block, and automatically displaying content corresponding to the second type information in a second area among the plurality of preset areas of the created content block; and displaying a synchronization control in the first document, wherein the synchronization control is configured to synchronize the first content in the first document with a page from which the first content sources.

* * * * *